(12) United States Patent
Wright

(10) Patent No.: US 6,834,900 B2
(45) Date of Patent: Dec. 28, 2004

(54) FLEXIBLE-MEMBER-ROUTING ARRANGEMENT AND BRACKET

(75) Inventor: Christopher F. Wright, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 4 days.

(21) Appl. No.: 10/787,028

(22) Filed: Feb. 25, 2004

(65) Prior Publication Data

US 2004/0164576 A1 Aug. 26, 2004

Related U.S. Application Data

(60) Division of application No. 10/338,611, filed on Jan. 8, 2003, which is a continuation-in-part of application No. 10/269,350, filed on Oct. 11, 2002, now abandoned.

(51) Int. Cl.[7] .................................................. B60J 9/00
(52) U.S. Cl. ........................ 296/1.01; 137/899; 280/421; 248/49
(58) Field of Search ........................... 248/49, 53, 73, 248/74.3, 75, 71; 296/1.01, 208; 280/421; 137/899

(56) References Cited

U.S. PATENT DOCUMENTS

| | | | | |
|---|---|---|---|---|
| 2,372,674 A | * | 4/1945 | Russ .............................. | 248/65 |
| 5,419,519 A | * | 5/1995 | Mangone, Jr. ................ | 248/49 |
| 6,049,040 A | * | 4/2000 | Biles et al. ................... | 174/68.3 |
| 6,467,734 B1 | * | 10/2002 | Brown et al. ................. | 248/65 |
| 6,747,208 B2 | * | 6/2004 | Miyamoto et al. ........... | 174/68.1 |

* cited by examiner

Primary Examiner—Dennis H. Pedder
(74) Attorney, Agent, or Firm—Jeffrey P. Calfa; Dennis Kelly Sullivan; Susan L. Lukasik

(57) ABSTRACT

An assembly comprises a flexible member that extends through an aperture defined by a divider component. A distal portion of the flexible member extends away from the assembly at an angle. A first flexible-member-routing bracket is mounted to the divider component and has one or more guide structures that function to facilitate a gradual transition of the flexible member from the direction it extends in as it passes through the aperture defined by the divider component to the direction its distal portion extends in.

4 Claims, 17 Drawing Sheets

FLEXIBLE-MEMBER-ROUTING ARRANGEMENT AND BRACKET

This is a division of application Ser. No. 10/338,611 filed Jan. 8, 2003 which is a continuation-in-part of application Ser. No. 10/269,350 filed Oct. 11, 2002, now abandoned.

BACKGROUND OF THE INVENTION

The present invention relates to arrangements for routing flexible members in a non-linear manner within assemblies.

DRAWINGS

Other objects and advantages of the invention will become more apparent upon perusal of the detailed description thereof and upon inspection of the drawings in which.

Figure 14:
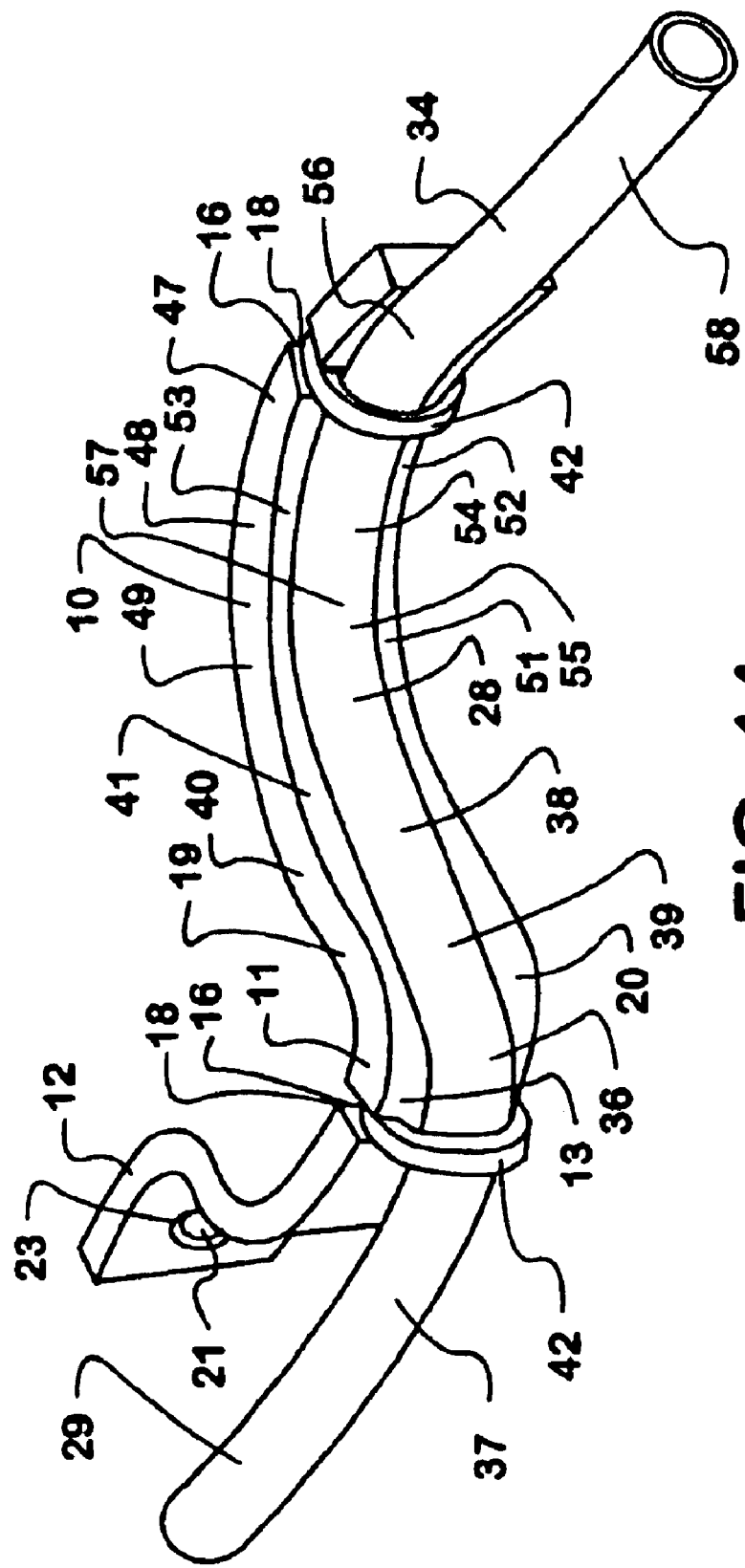

FIG. 14 is a perspective view of a flexible member that is strapped to an embodiment of a first flexible-member-routing bracket that is constructed in such a manner that, when it is properly mounted to a divider component, the opposite-side trailing guide-surface defined by its opposite-side trailing guide-structure will generally face the flexible-member-routing aperture defined by the divider component.

Figure 15:
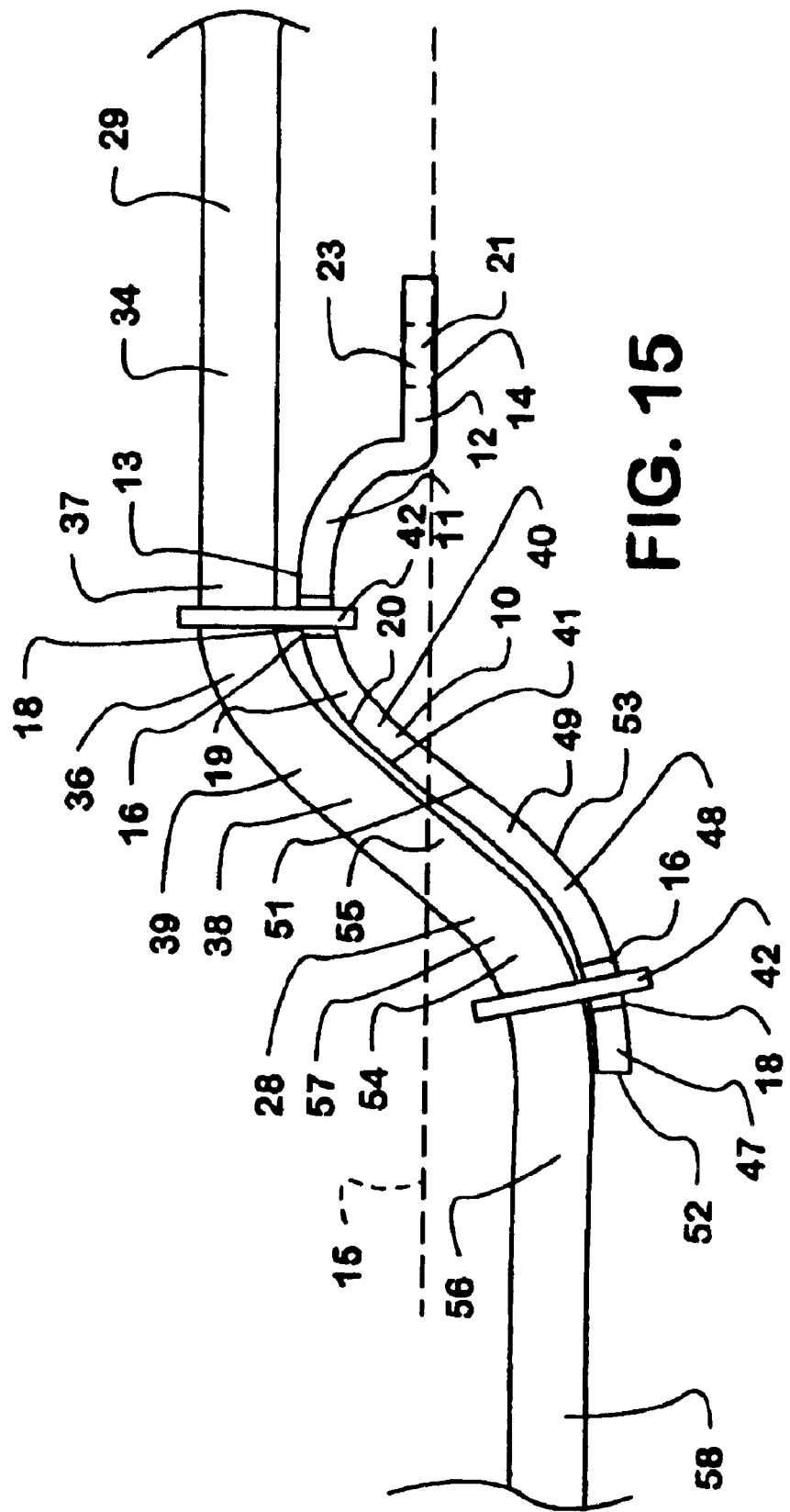

FIG. 15 is a plan view of the embodiment of a first flexible-member-routing bracket that is shown in FIG. 14 with a flexible member 34 strapped thereto.

Figure 16:
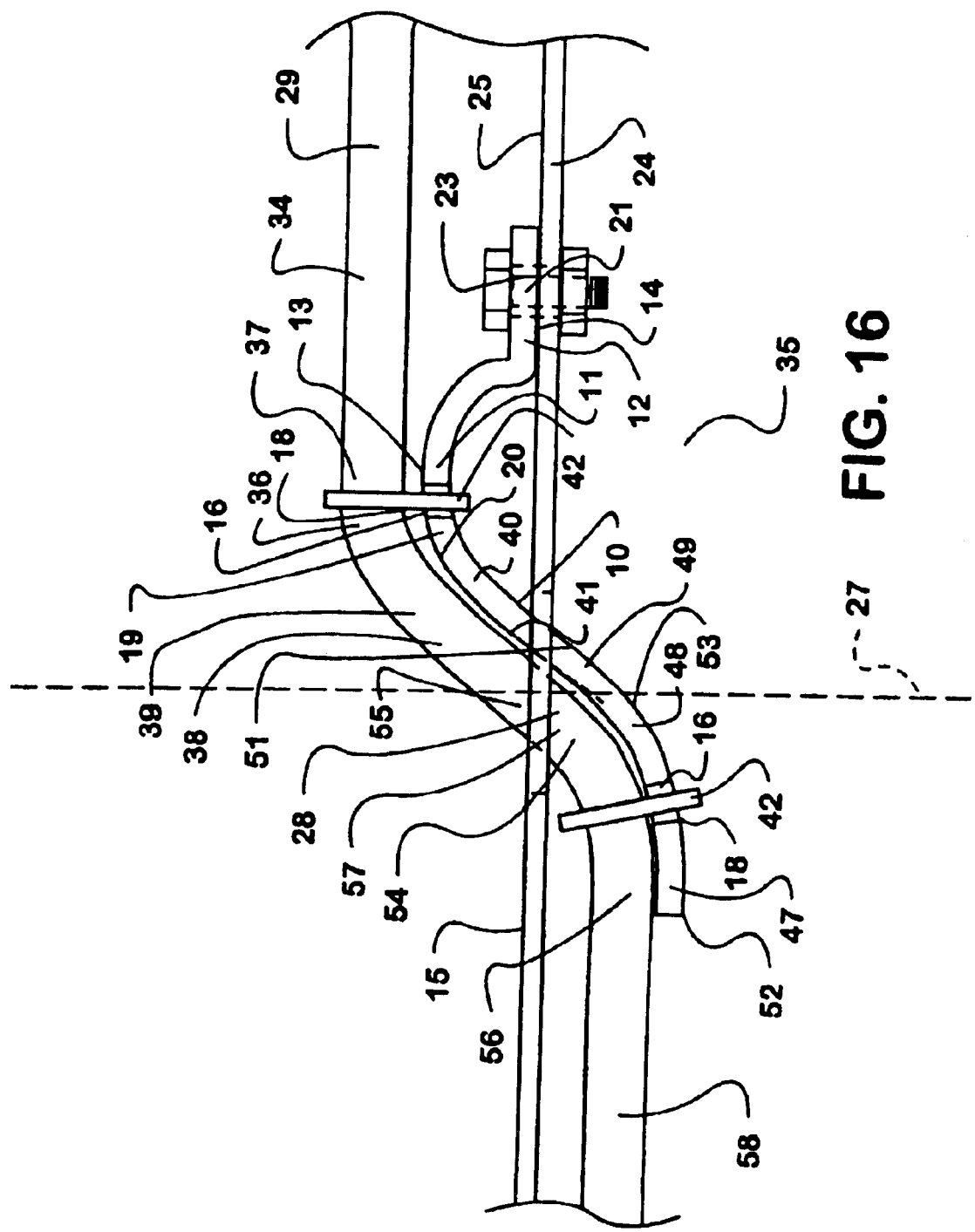

FIG. 16 is a plan view of a tenth embodiment of an assembly according to the present invention which includes the embodiment of a first flexible-member-routing bracket shown in FIGS. 14 and 15.

Figure 17:
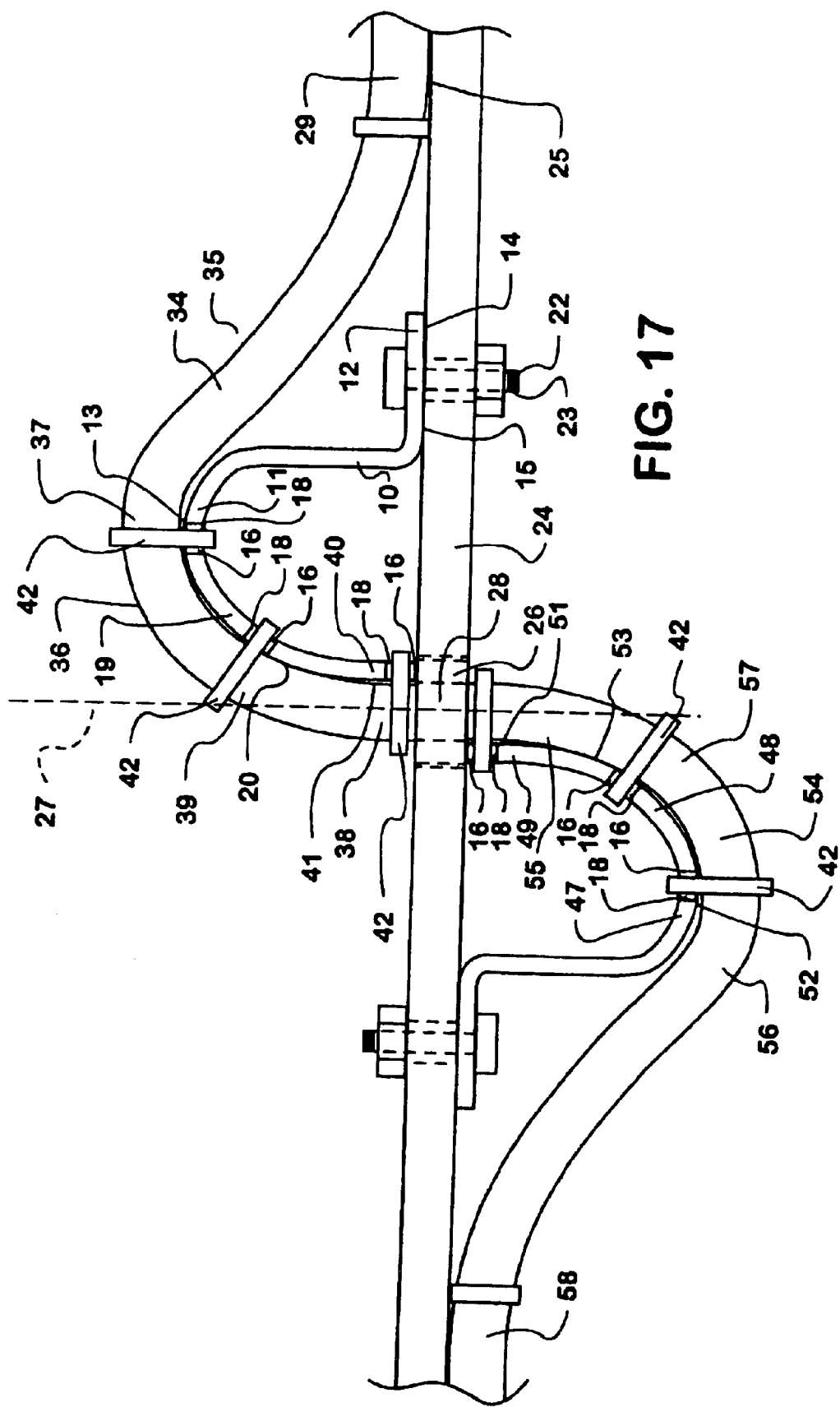

FIG. 17 is a plane view of an eleventh embodiment of an assembly according to the present invention which includes a first flexible-member-routing bracket and a second flexible-member-routing bracket mounted to a side of the divider component opposite the first flexible-member-routing bracket.

DETAILS OF INVENTION

The present invention is an arrangement for routing a flexible member 34 in a gradually-transitioning non-linear manner in an assembly 35 and a first flexible-member-routing bracket 10 that provides for the routing arrangement of the present invention. FIGS. 1-17 illustrate assemblies 35 and first flexible-member-routing brackets 10 in accordance with the present invention. An assembly 35 in accordance with the present invention comprises a divider component 24 that defines a flexible-member-routing aperture 26 through itself. A penetrating portion 28 of a flexible member 34 extends through the flexible-member-routing aperture 26. A distal portion 29 of the flexible member 34 extends away from the flexible-member-routing aperture 26 at an angle of at least 30 degrees to an aperture axis 27 of the flexible-member-routing aperture 26. The flexible member 34 also comprises an opposite-side distal portion 58 that is disposed upon a side of its penetrating portion 28 opposite the distal portion 29. In some embodiments of the present invention the distal portion 29 of the flexible member 34 extends away from the aperture axis 27 of the flexible-member-routing aperture 26 at an angle of greater than 45 degrees. In many embodiments of the present invention an assembly 35 constructed in accordance therewith includes a distal flexible-member-routing surface 25 that is defined by the divider component 24 or some other component of the assembly 35, that extends at an angle of at least 30 degrees to the aperture axis 27 of the flexible-member-routing aperture 26, and adjacent which at least a portion of the distal portion 29 of the flexible member 34 extends. In some embodiments of the present invention a distal flexible-member-routing surface 25 defined by the divider component 24 extends at an angle of greater than 45 degrees relative to the aperture axis 27 of the flexible-member-routing aperture 26. An intermediate portion 36 of the flexible member 34 extends between the distal portion 29 and the penetrating portion 28 thereof.

An assembly 35 according to the present invention includes a first flexible-member-routing bracket 10 that functions to ensure gradual transition of the flexible member 34 as it extends from its distal portion 29 that is disposed at an angle of at least 30 degrees to the aperture axis 27 to its penetrating portion 28 that extends through the flexible-member-routing aperture 26. The first flexible-member-routing bracket 10 is serviceably fixedly engaged to the divider component 24 through serviceable fixed engagement of its mounting structure 12 to the divider component 24. For purposes of this disclosure the term serviceably fixedly engaged is to be understood to mean that a component is fixedly engaged to another in such a manner that the two components may be readily separated from one another without rendering either of the components unusable. Components that are fixedly engaged to one another by fasteners such as threaded fasteners, clips, and rivets would, for instance, be considered to be serviceably fixedly engaged to one another. By contrast, components that are fixedly engaged to one another through means such as welding would generally be considered to be non-serviceably fixedly engaged to one another. In some embodiments of the present invention a first flexible-member-routing bracket 10 according to the present invention comprises trailing guide-structure 11 that is disposed upon a same side of the divider component 24 as is the mounting structure 12 of the first flexible-member-routing bracket 10 and that defines a trailing guide-surface 13. The construction of such a first flexible-member-routing bracket 10 according to the present invention is such that, when it is properly mounted to the divider component 24, its trailing guide-surface 13 is disposed at a distance from the flexible-member-routing aperture 26 in directions parallel to the aperture axis 27 thereof. The construction of such a first flexible-member-routing bracket 10 according to the present invention is further such that, when it is properly mounted to the divider component 24 its trailing guide-surface 13 is disposed at a distance from the aperture axis 27. The construction of a first flexible-member-routing bracket 10 that comprises trailing guide-structure 11 and a trailing guide-surface 13 defined thereby, is further such that, when it is properly mounted to the divider component 24, the trailing guide-surface 13 is disposed at an angle of at least 30 degrees relative to the aperture axis 27 of the flexible-member-routing aperture 26. In assemblies 35 according to the present invention that include such a first flexible-member-routing bracket 10, the flexible member 34 has a trailing portion 37 of its transition portion 36 disposed adjacent to the trailing guide-surface 13 of the first flexible-member-routing bracket 10. As will be described in greater detail below, in many embodiments of the present invention the relative positions and/or engagement to one another of the trailing portion 37 of the transition portion 36 of the flexible member 34 and the trailing guide-structure 11 is/are such that the trailing guide-structure 11 functions to maintain the trailing portion 37 of the transition portion 36 at a distance from the flexible-member-routing aperture 26 in directions parallel to the aperture axis 27. In such embodiments of the present invention, by maintaining the trailing portion 37 of the transition portion 36 of the flexible member 34 in spaced relationship with the flexible-member-routing aperture 26, the trailing guide-structure 11 helps to ensure that the transition portion 36 will extend in a gently curving manner between the distal portion 29 and the penetrating portion 28 of the flexible member 34. The greater the distance between the trailing portion 37 of the transition portion 36 of the flexible member 34 and the flexible-member-routing aperture 26 in directions parallel to the aperture axis 27, the more gradual is the manner in which the transition portion 36 curves as it extends between the distal portion 29 and the penetrating portion 28 of the flexible member 34. Thus, in embodiments where the trailing guide-structure 11 of the first flexible-member-routing bracket 10 functions to maintain the trailing portion 37 of the transition portion 36 of the flexible member 34 in spaced relationship to the flexible-member-routing aperture 26, it is generally the case that, the greater the distance between the trailing guide-structure 11 and the flexible-member-routing aperture 26 in directions parallel to the aperture axis 27, the more gentle will be the curvature of the transition portion 36 of the flexible member 34. In some embodiments of the present invention, assemblies 35 constructed in accordance therewith are configured in such a manner that the distance between the trailing guide-surface 13 and the flexible-member-routing aperture 26 in directions parallel to the aperture axis 27 is at least three times a minimum diametrical dimension of the transition portion 36 of the flexible member 34. In some assemblies according to the present invention the trailing guide-surface 13 of a first flexible-member-routing bracket 10 is disposed at an angle of greater than 45 degrees relative to the aperture axis 27 of the flexible-member-routing aperture 26.

Figure 10:
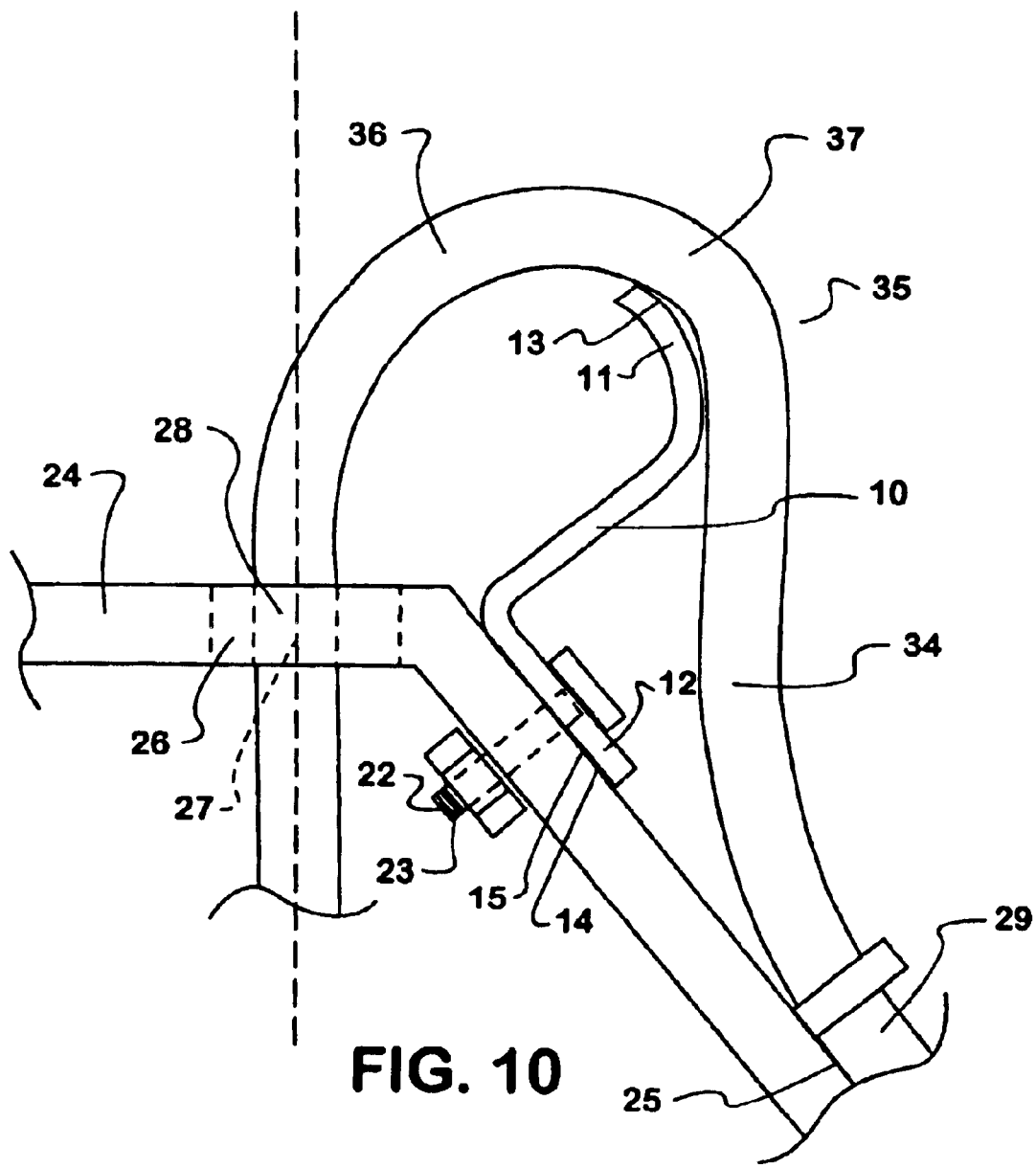
FIG. 10 is a plan view of an eighth embodiment of an assembly according to the present invention including a first flexible-member-routing bracket that is mounted to a portion of the divider component that is disposed at an angle of greater than 90 degrees relative to the aperture axis of the flexible-member-routing aperture.

It is important to note that, for purposes of this disclosure the angle between the aperture axis 27 and features of the assembly 35 that are disposed upon a same side of the divider component 24 as the mounting structure 12 of the first flexible-member-routing bracket 10 is always defined to be the angle between that feature and the portion of the aperture axis 27 that is disposed upon the same side of the divider component 24 as the mounting structure of the first flexible-member-routing bracket 10. It is important that this convention for measuring the angle between the aperture axis 27 and other features of an assembly 35 be utilized in order to ensure proper recognition of all assemblies that are in accordance with this invention. For instance, FIG. 10 illustrates an assembly 35 that is in accordance with the present invention. According to the above-described convention for measuring the angle between the aperture axis 27 and the other features of the assembly 35 the distal portion 29 of the flexible member 34 extends away from the penetrating portion 28 of the flexible member 34 at an angle of greater than 90 degrees. If a person were to erroneously determine the angle between the aperture axis 27 and the distal portion 29 of the flexible member 34 by measuring the angle between the distal portion 29 of the flexible member 34 and the portion of the aperture axis 27 that is on the side of the divider component 24 opposite that upon which the flexible-member-routing bracket 10 is disposed, they would erroneously determine the angle between the aperture axis 27 and the distal portion 29 of the flexible member 34 to be less than 90 degrees. Similar erroneous determination of the angle between the aperture axis 27 and other features of the assembly 35 would lead to the incorrect conclusion that the assembly shown in FIG. 10 is not in accordance with the present invention. By utilizing the above-described convention for determining the angle between the aperture axis 27 and other features of the assembly 35 one would correctly determine that the angle between the aperture axis 27 and the distal portion 29 of the flexible member 34 shown in FIG. 10 is greater than 90 degrees and further that the angles between each of the other features of the assembly 35 shown in FIG. 10 and the aperture axis 27 thereof are such that the assembly 35 of FIG. 10 is in accordance with the present invention. It is also important to note that, for purposes of this disclosure the angle between the aperture axis 27 and features of the assembly 35 that are disposed upon a side of the divider component 24 opposite the mounting structure 12 of the first flexible-member-routing bracket 10 is always defined to be the angle between that feature and the portion of the aperture axis 27 that is disposed upon the opposite side of the divider component 24 as the trailing guide-structure 11 of the first flexible-member-routing bracket 10.

In some embodiments of the present invention, such as those shown in FIGS. 1, 3, 5, 6, 8, 9,10, 11, 16, and 17 the trailing guide-surface 13 of a first flexible-member-routing bracket 10 faces away from the flexible-member-routing aperture 26. In other embodiments of the present invention, such as that shown in FIG. 2, the trailing guide-surface 13 of a first flexible-member-routing bracket 10 faces generally toward the flexible-member-routing aperture 26. In some embodiments of the present invention, such as those shown in FIG. 5, a first flexible-member-routing bracket 10 has a trailing guide-surface 13 that faces away from the flexible-member-routing aperture 26 and also has another surface that is parallel to and faces the trailing guide-surface 13 and that is disposed upon an opposite side of the flexible member 34 from the trailing guide-surface 13. In embodiments of assemblies 35 according to the present invention in which the trailing guide-surface 13 faces away from the flexible-member-routing aperture 26, abutment between the trailing guide-surface 13 and the trailing portion 37 of the transition portion 36 of the flexible member 34 functions to maintain the trailing portion 37 in spaced relationship to the flexible-member-routing aperture 26. In some of the embodiments of assemblies 35 according to the present invention, such as that shown in FIG. 2, in which the trailing guide-surface 13 faces generally toward the flexible-member-routing aperture 26, the trailing portion 37 of the transition portion 36 of the flexible member 34 is engaged to the trailing guide-structure 11 through means such as straps 42 so that the trailing guide-structure 11 functions to maintain the trailing portion 37 of the transition portion 36 in spaced relationship to the flexible-member-routing aperture 26.

In some embodiments of the present invention, such as those shown in FIGS. 1, 2, 4, 5, 6, 7, and 8, 11, 16, and 17 the first flexible-member-routing bracket 10 comprises leading guide-structure 40 that is disposed upon a same side of the divider component 24 as is the mounting structure 12 of the first flexible-member-routing bracket 10, and which further facilitates desirable routing of the flexible member 34. The leading guide-structure 40 of a first flexible-member-routing bracket 10 according to the present invention is directly or indirectly fixedly engaged to the mounting structure 12 thereof. The leading guide-structure 40 of a first flexible-member-routing bracket 10 defines a leading guide-surface 41. Additionally, in such assemblies 35 according to the present invention, the leading guide-surface 41 is disposed adjacent to the flexible-member-routing aperture 26 and extends at angles of less than 60 degrees relative to the aperture axis 27. In such embodiments of the present invention a leading portion 38 of the transition portion 36 of the flexible member 34 extends adjacent the leading guide-surface 41 and movement of the leading portion 38 of the transition portion 36 away from the aperture axis 27 is limited by the leading guide-surface 41. This constriction of movement of the leading portion 38 of the transition portion 36 by the leading guide-surface 41 further helps to ensure that the transition portion 36 extends in a gently curving manner between the distal portion 29 and the penetrating portion 28 of the flexible member 34. In some embodiments of the present invention the leading guide-surface 41 of the first flexible-member-routing bracket 10 extends at an angle of less than 45 degrees relative to the aperture axis 27 of the flexible-member-routing aperture 26. Assemblies 35 according to the present invention that include a first flexible-member-routing bracket 10 with both a leading guide-surface 41 and a trailing guide-surface 13 are configured in such a manner that the leading guide-surface 41 is closer to the flexible-member-routing aperture 26 in directions parallel to the aperture axis 27 than the trailing guide-surface 13. In such assemblies 35 according to the present invention the leading guide-surface 41 is also disposed closer to the aperture axis 27 in directions perpendicular thereto than is the trailing guide-surface 13. In some such assemblies 35 of the present invention a first flexible-member-routing bracket 10 according to the present invention that also includes a trailing guide-surface 13 is further constructed such that the angle between its leading guide-surface 41 and the aperture axis 27 is at least 30 degrees less than the angle between its trailing guide-surface 13 and the aperture axis 27. In some such assemblies 35 of the present invention a first flexible-member-routing bracket 10 according to the present invention that also includes a trailing guide-surface 13 is further constructed such that the angle between its leading guide-surface 41 and the aperture axis 27 is at least 45 degrees less than the angle between its trailing guide-surface 13 and the aperture axis 27. In some embodiments of the present invention, such as those shown in FIGS. 1, 7, 11 and 16 the leading guide-structure 40 and the leading guide-surface 41 of a first flexible-member-routing bracket 10 also extend through the flexible-member-routing aperture 26 and meet opposite-side leading guide-structure 49 that defines an opposite-side leading guide-surface 51 as is described in greater detail below.

In some embodiments of the present invention, such as those shown in FIGS. 1, 2, 4, 5, 6, 8, 11, 12, 13, 14, 15, 16 and 17, a first flexible-member-routing bracket 10 comprises intermediate guide-structure 19 that is fixedly engaged to and extends between the trailing guide-structure 11 and the leading guide-structure 40. In some embodiments of the present invention, such as those shown in FIGS. 1, 2, 4, 5, 6, 8, 11, 12, 13, 14, 15, 16 and 17, the intermediate guide-structure 19 of such an embodiment of a first flexible-member-routing bracket 10 defines an intermediate guide-surface 20 that extends in a sweeping manner between the leading guide-surface 41 and the trailing guide-surface 13. In assemblies 35 that utilize such embodiments of a first flexible-member-routing bracket 10 an intermediate portion 39 of the transition portion 36 of the flexible member 34 extends adjacent the intermediate guide-surface 20. Thus, in such embodiments of the present invention the intermediate guide-surface 20 limits the movement of the intermediate portion 39 of the transition portion 36 of the flexible member 34 and further helps ensure that the transition portion 36 gently curves as it extends between the distal portion 29 and the penetrating portion 28 of the flexible member 34.

In some embodiments of the present invention one or more portions of the flexible member 34 are strapped to the first flexible-member-routing bracket 10 to further help ensure that the transition portion 36 of the flexible member 34 extends in a gently curving manner between the distal portion 29 and the penetrating portion 28. A portion of the flexible member 34 is considered to be strapped to the first flexible-member-routing bracket 10 if a strap 42 that is mounted to the first flexible-member-routing bracket 10 surrounds it. A strap 42 may be mounted to the first flexible-member-routing bracket through fasteners, as a result of a portion of the strap 42 extending through an aperture or channel defined through the first flexible-member-routing bracket 10, and/or as a result of the strap 42 being snugly wrapped around the first flexible-member-routing bracket 10 and the flexible member 34. In some embodiments of the present invention, such as those shown in FIGS. 1, 2, 6, 8, 14, 15, 16 and 17, the trailing portion 37 of the transition portion 36 of the flexible member 34 is strapped to the trailing guide-structure 11 of the first flexible-member-routing bracket 10. In some embodiments of the present invention, such as those shown in FIGS. 1, 2, 7, 8 and 17, the leading portion 38 of the transition portion 36 of the flexible member 34 is strapped to the leading guide-structure 40 of the first flexible-member-routing bracket 10. In some embodiments of the present invention, such as those shown in FIGS. 1, 2, 8, 11, 12, 13, and 17, the intermediate portion 39 of the transition portion 36 of the flexible member 34 is strapped to the intermediate guide-structure 19 of the first flexible-member-routing bracket 10.

In some embodiments of the present invention, such as those shown in FIGS. 1, 2, 4, 7, 11, 12, 13, 14, 15, 16, and 17, a first flexible-member-routing bracket 10 defines one or more strap-locating features 16 including one or more strap-locating apertures 17 and/or one or more strap-locating channels 18 that extend through the first flexible-member-routing bracket 10. As is illustrated in FIGS. 1, 2, 4, 7, 11, 12, 13, 14, 15, 16, and 17, assemblies 35 according to the present invention that include such a first flexible-member-routing bracket 10 often have straps 42 that extend through strap-locating features 16, which function to help maintain those straps 42 in their desired positions. Some first flexible-member-routing brackets 10 according to the present invention, such as those shown in FIGS. 1, 2, 4, 14, 15, 16, and 17, comprise trailing guide-structure 11 that defines one or more strap-locating features 16 through which straps 42 of assemblies 35 that include those first flexible-member-routing brackets 10 may extend. Some first flexible-member-routing brackets 10 according to the present invention, such as those shown in FIGS. 1, 2, 4, 7, and 17, may comprise leading guide-structure 40 that defines one or more strap-locating features 16 through which straps 42 of assemblies 35 that include those first flexible-member-routing brackets 10 may extend. Some first flexible-member-routing brackets 10 according to the present invention, such as those shown in FIGS. 1, 2, 4, 11, 12, 13, and 17, comprise intermediate guide-structure 19 that defines one or more strap-locating features 16 through which straps 42 of assemblies 35 that include those first flexible-member-routing brackets 10 may extend. Strap-locating features 16 defined by a first flexible-member-routing bracket 10 according to the present invention may extend in any direction through the first flexible-member-routing bracket 10. In some embodiments of the present invention strap-locating features 16 extend through a first flexible-member-routing bracket 10 in such a direction that, when the first flexible-member-routing bracket 10 is properly assembled with the other components of an assembly 35 according to the present invention, the direction in which the strap-locating features 16 extend through the first flexible-member-routing bracket 10 is perpendicular to the direction that adjacent portions of the flexible member 34 extend in. Straps 42 that are looped through strap-locating features 16 that are so oriented are prevented from sliding along the flexible member 34. As is mentioned elsewhere in the disclosure, in some embodiments of the present invention, such as those shown in FIGS. 1, 7, 11, 12, 13, 14, 15, 16, and 17, a first flexible-member-routing bracket 10 has leading guide-structure 40 that extends all the way through the flexible-member-routing aperture 26 and meets opposite-side leading guide-structure 49 that is disposed upon a side of the divider component 24 opposite the mounting structure 12 of the first flexible-member-routing bracket 10. In some such embodiments, such as those shown in FIGS. 1 and 7, of the present invention the first flexible-member-routing bracket 10 has leading guide-structure 40 that defines one or more strap-locating features 16 and opposite-side leading guide-structure 49 that also defines one or more strap-locating features 16. Such a construction of a first flexible-member-routing bracket 10 facilitates desirable routing of the flexible member 34 by providing for strapping of the flexible member 34 to the leading guide-structure 40 and the opposite-side leading guide-structure 49.

In some embodiments of the present invention, the opposite-side distal portion 58 of the flexible member 34 extends away from its penetrating portion 28 at an angle of 30 degrees or more relative to the aperture axis 27. In such embodiments of the present invention the flexible member 34 comprises an opposite-side transition portion 54 that extends between its penetrating portion 28 and its opposite-side distal portion 58. In some such embodiments of the present invention the assembly 35 comprises opposite-side leading guide-structure 49, opposite-side trailing guide-structure 47, and/or opposite-side intermediate guide-structure 48 that are disposed upon a side of the divider component 24 opposite the mounting structure 12 of the first flexible-member-routing bracket 10 and that function to promote gradual curving extension of the opposite-side transition portion 54 of the flexible member 34 between its penetrating portion 28 and its opposite-side distal portion 58. Such assemblies according to the present invention are illustrated in FIGS. 1, 7, 11, 12, 13, 14, 15, 16, and 17. As is illustrated in FIG. 17, some such embodiments of assemblies 35 of the present invention comprise a second flexible-member-routing bracket 50 that is serviceably fixedly engaged to the divider component 24 and that comprises opposite-side leading guide-structure 49, opposite-side trailing guide-structure 47, and/or opposite-side intermediate guide-structure 48. Alternatively, as is illustrated in FIGS. 1, 7, 11, 12, 13, 14, 15, and 16, in some embodiments of assemblies 35 of the present invention the first flexible-member-routing bracket 10 comprises opposite-side leading guide-structure 49, opposite-side trailing guide-structure 47, and/or opposite-side intermediate guide-structure 48. In some embodiments of the present invention the opposite-side distal portion 58 of the flexible member 34 extends away from the flexible-member-routing aperture 26 at an angle of greater than 45 relative to the aperture axis 27.

In many embodiments of assemblies 35 of the present invention that include opposite-side trailing guide-structure 47, that opposite-side trailing guide-structure 47 defines an opposite-side trailing guide-surface 52 that is disposed at a distance from the flexible-member-routing aperture 26 in directions parallel to the aperture axis 27 thereof. The opposite-side trailing-guide surface 52 is further disposed at a distance from the aperture axis 27 of the flexible-member-routing aperture 26. The construction of an assembly 35 that comprises opposite-side trailing guide-structure 47 and an opposite-side trailing guide-surface 52 defined thereby, is further such that the opposite-side trailing guide-surface 52 is disposed at an angle of at least 30 degrees relative to the aperture axis 27 of the flexible-member-routing aperture 26. In assemblies 35 according to the present invention that include opposite-side trailing guide-structure 47 and an opposite-side trailing guide-surface 52 defined thereby, the flexible member 34 has an opposite-side trailing portion 56 of its opposite-side transition portion 54 disposed adjacent to the opposite-side trailing guide-surface 52. As will be described in greater detail below, in many embodiments of the present invention the relative positions and/or engagement to one another of the opposite-side trailing portion 56 of the opposite-side transition portion 54 of the flexible member 34 and the opposite-side trailing guide-structure 47 is/are such that the opposite-side trailing guide-structure 47 functions to maintain the opposite-side trailing portion 56 of the opposite-side transition portion 54 at a distance from the flexible-member-routing aperture 26 in directions parallel to the aperture axis 27. In such embodiments of the present invention, by maintaining the opposite-side trailing portion 56 of the opposite-side transition portion 54 of the flexible member 34 in spaced relationship with the flexible-member-routing aperture 26, the opposite-side trailing guide-structure 47 helps to ensure that the opposite-side transition portion 54 will extend in a gently curving manner between the opposite-side distal portion 58 and the penetrating portion 28 of the flexible member 34. The greater the distance between the opposite-side trailing portion 56 of the opposite-side transition portion 54 of the flexible member 34 and the flexible-member-routing aperture 26 in directions parallel to the aperture axis 27, the more gradual is the manner in which the opposite-side transition portion 54 curves as it extends between the opposite-side distal portion 58 and the penetrating portion 28 of the flexible member 34. Thus, in embodiments where the opposite-side trailing guide-structure 47 functions to maintain the opposite-side trailing portion 56 of the opposite-side transition portion 54 of the flexible member 34 in spaced relationship to the flexible-member-routing aperture 26, it is generally the case that, the greater the distance between the opposite-side trailing guide-structure 47 and the flexible-member-routing aperture 26 in directions parallel to the aperture axis 27, the more gentle will be the curvature of the opposite-side transition portion 54 of the flexible member 34. In some embodiments of the present invention, assemblies 35 constructed in accordance therewith are configured in such a manner that the distance between the opposite-side trailing guide-surface 52 and the flexible-member-routing aperture 26 in directions parallel to the aperture axis 27 is at least three times a minimum diametrical dimension of the opposite-side transition portion 54 of the flexible member 34. In some embodiments of the present invention the opposite-side trailing guide-surface 52 is disposed at an angle of greater than 45 degrees relative to the aperture axis 27 of the flexible-member-routing aperture 26.

Figure 11:
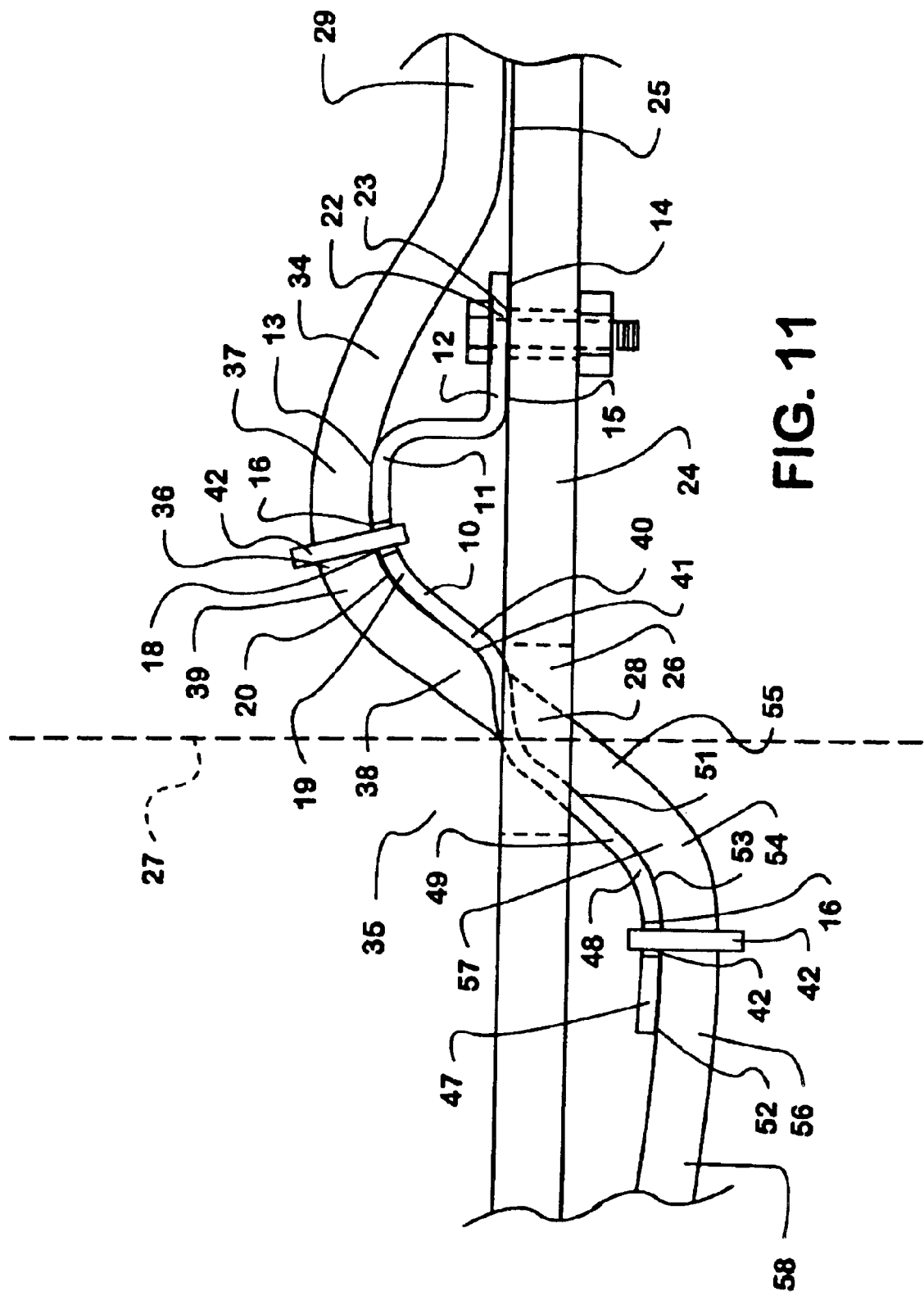
FIG. 11 is a plan view of a ninth embodiment of an assembly according to the present invention including an embodiment of a first flexible-member-routing bracket that comprises opposite-side trailing guide-structure that defines an opposite-side trailing guide surface that faces away from the flexible-member-routing aperture.
Figure 12:
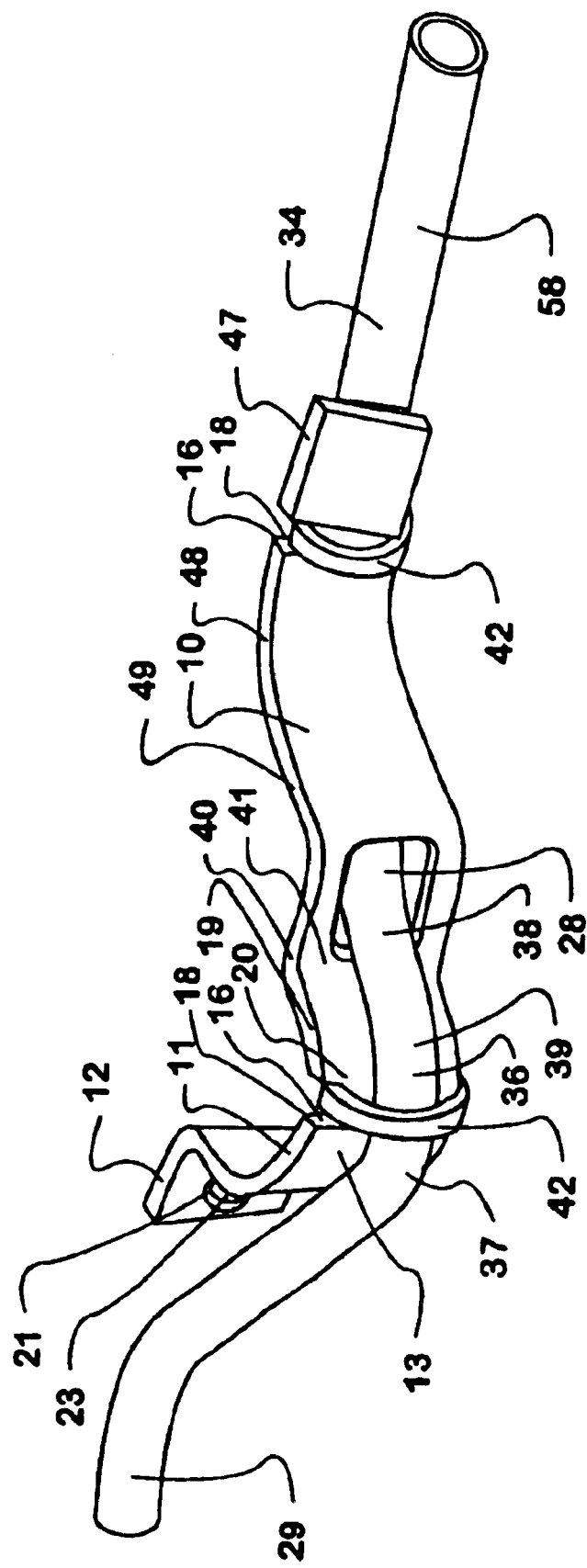
FIG. 12 is a perspective view of the embodiment of first flexible-member-routing bracket shown in FIG. 11 with a flexible member strapped thereto.
Figure 13:
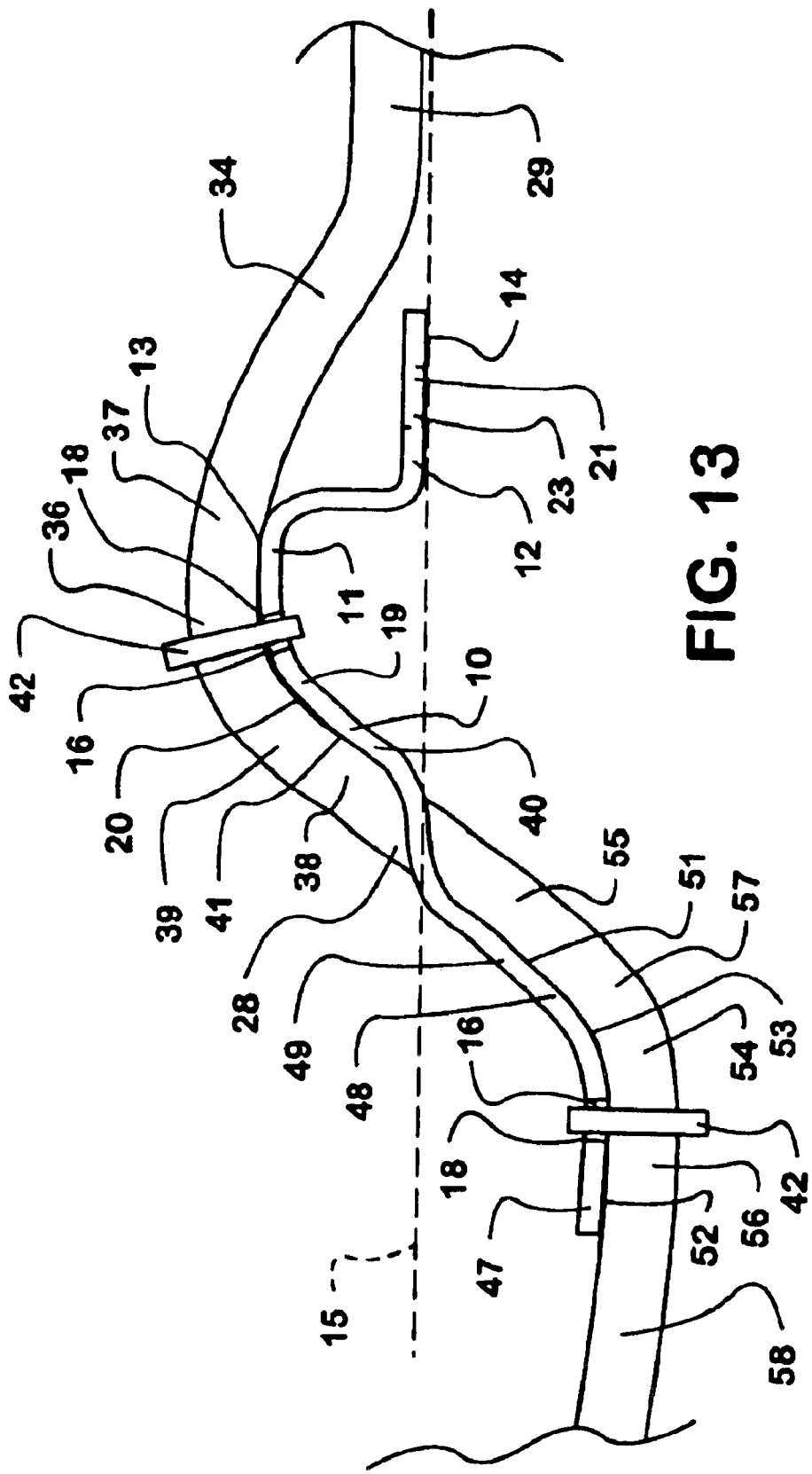
FIG. 13 is a plan view of the embodiment of first flexible-member-routing bracket shown in FIG. 11 with a flexible member strapped thereto.

In some embodiments of the present invention, such as those shown in FIGS. 11 and 17, the opposite-side trailing guide-surface 52 of an assembly 35 faces away from the flexible-member-routing aperture 26. In other embodiments of the present invention, such as the one shown in FIG. 16, the opposite-side trailing guide-surface 52 faces generally toward the flexible-member-routing aperture 26. In embodiments of assemblies 35 according to the present invention in which the opposite-side trailing guide-surface 52 faces away from the flexible-member-routing aperture 26, abutment between the opposite-side trailing guide-surface 52 and the opposite-side trailing portion 56 of the opposite-side transition portion 54 of the flexible member 34 functions to maintain the opposite-side trailing portion 56 in spaced relationship to the flexible-member-routing aperture 26. In some of the embodiments of assemblies 35 according to the present invention, such as the one shown in FIG. 16, in which the opposite-side trailing guide-surface 52 faces generally toward the flexible-member-routing aperture 26, the opposite-side trailing portion 56 of the opposite-side transition portion 54 of the flexible member 34 is engaged to the opposite-side trailing guide-structure 47 through means such as straps 42 so that the opposite-side trailing guide-structure 47 functions to maintain the opposite-side trailing portion 56 of the opposite-side transition portion 54 in spaced relationship to the flexible-member-routing aperture 26.

As was mentioned above, some assemblies 35 according to the present invention comprise opposite-side leading guide-structure 49. The opposite-side leading guide-structure 49 of an assembly according to the present invention defines an opposite-side leading guide-surface 51. The opposite-side leading guide-surface 51 is disposed adjacent to the flexible-member-routing aperture 26. Additionally, in such assemblies 35 according to the present invention, the opposite-side leading guide-surface 51 extends at angles of less than 60 degrees relative to the aperture axis 27. In such embodiments of the present invention an opposite-side leading portion 55 of the opposite-side transition portion 54 of the flexible member 34 extends adjacent the opposite-side leading guide-surface 51 and movement of the opposite-side leading portion 55 of the opposite-side transition portion 54 away from the aperture axis 27 is limited by the opposite-side leading guide-surface 51. This constriction of movement of the opposite-side leading portion 55 of the opposite-side transition portion 54 by the opposite-side leading guide-surface 51 further helps to ensure that the opposite-side transition portion 54 extends in a gently curving manner between the opposite-side distal portion 58 and the penetrating portion 28 of the flexible member 34. In some embodiments of the present invention the opposite-side leading guide-surface 51 of an assembly 35 is disposed at an angle of less than 45 degrees relative to the aperture axis 27 of the flexible-member-routing aperture 26. An assembly 35 according to the present invention that includes an opposite-side leading guide-surface 51 and an opposite-side trailing guide-surface 52 is configured in such a manner that the opposite-side leading guide-surface 51 is closer to the flexible-member-routing aperture 26 in directions parallel to the aperture axis 27 than the opposite-side trailing guide-structure 52. In such assemblies 35 according to the present invention the opposite-side leading guide-surface 51 is also disposed closer to the aperture axis 27 in directions perpendicular thereto than is the opposite-side trailing guide-surface 52. In some assemblies 35 of the present invention that comprise both an opposite-side leading guide-surface 51 and an opposite-side trailing guide-surface 52 the angle between the opposite-side leading guide-surface 51 and the aperture axis 27 is at least 30 degrees less than the angle between the opposite-side trailing guide-surface 52 and the aperture axis 27. In some assemblies 35 of the present invention that comprise both an opposite-side leading guide-surface 51 and an opposite-side trailing guide-surface 52 the angle between the opposite-side leading guide-surface 51 and the aperture axis 27 is at least 45 degrees less than the angle between the opposite-side trailing guide-surface 52 and the aperture axis 27.

In some embodiments of the present invention, such as those shown in FIGS. 11, 12, 13, 14, 15, 16, and 17, an assembly 35 thereof comprises opposite-side intermediate guide-structure 48 that is fixedly engaged to and extends between the opposite-side trailing guide-structure 47 and the opposite-side leading guide-structure 49. In some embodiments of the present invention, such as those shown in FIGS. 11, 12, 13, 14, 15, 16, and 17, the opposite-side intermediate guide-structure 48 defines an opposite-side intermediate guide-surface 53 that extends in a sweeping manner between the opposite-side leading guide-surface 51 and the opposite-side trailing guide-surface 52. In such assemblies 35 an opposite-side intermediate portion 57 of the opposite-side transition portion 54 of the flexible member 34 extends adjacent the opposite-side intermediate guide-surface 53. Thus, in such embodiments of the present invention the opposite-side intermediate guide-surface 53 limits the movement of the opposite-side intermediate portion 57 of the opposite-side transition portion 54 of the flexible member 34 and further helps ensure that the opposite-side transition portion 54 gently curves as it extends between the opposite-side distal portion 58 and the penetrating portion 28 of the flexible member 34.

In some embodiments of the present invention one or more portions of the opposite-side transition portion 54 of the flexible member 34 are strapped to opposite-side leading guide-structure 49, opposite-side trailing guide-structure 47, and/or opposite-side intermediate guide-structure 48, which helps to ensure that the opposite-side transition portion 54 of the flexible member 34 extends in a gently curving manner between the opposite-side distal portion 58 and the penetrating portion 28. A portion of the flexible member 34 is considered to be strapped to a structure if a strap 42 that is mounted to that structure surrounds that portion of the flexible member 34. A strap 42 may be mounted to structure through fasteners, as a result of a portion of the strap 42 extending through an aperture or channel defined through the structure, and/or as a result of the strap 42 being snugly wrapped around the structure and the flexible member 34. In some embodiments of the present invention, such as the one shown in FIGS. 14, 15, and 16, the opposite-side trailing portion 56 of the opposite-side transition portion 54 of the flexible member 34 is strapped to the opposite-side trailing guide-structure 47. In some embodiments of the present invention, such as the one shown in FIG. 17, the opposite-side leading portion 55 of the opposite-side transition portion 54 of the flexible member 34 is strapped to the opposite-side leading guide-structure 49. In some embodiments of the present invention, such as the one shown in FIG. 17, the opposite-side intermediate portion 57 of the opposite-side transition portion 54 of the flexible member 34 is strapped to the opposite-side intermediate guide-structure 48.

In some embodiments of the present invention, such as those shown in FIGS. 11, 12, 13, 14, 15, 16, and 17, opposite-side trailing guide-structure 47, opposite-side intermediate guide-structure 48, and/or opposite-side leading guide-structure 49 define one or more strap-locating features 16 including one or more strap-locating apertures 17 and/or one or more strap-locating channels 18. As is illustrated in FIGS. 1, 2, 4, and 7, 11, 12, 13, 14, 15, 16, and 17, such assemblies 35 according to the present invention often have straps 42 that extend through strap-locating features 16, which function to help maintain those straps 42 in their desired positions. Some assemblies 35 according to the present invention, such as those shown in FIGS. 1, 2, 4, 14, 15, 16, and 17, comprise opposite-side trailing guide-structure 47 that defines one or more strap-locating features 16 through which straps 42 extend. Some assemblies 35 according to the present invention, such as the one shown in FIG. 17, comprise opposite-side leading guide-structure 49 that defines one or more strap-locating features 16 through which straps 42 extend. Some assemblies 35 according to the present invention, such as the one shown in FIG. 17, comprise opposite-side intermediate guide-structure 48 that defines one or more strap-locating features 16 through which straps 42 extend. Strap-locating features 16 defined by opposite-side trailing guide-structure 47, opposite-side intermediate guide-structure 48, and/or opposite-side leading guide-structure 49 according to the present invention may extend in any direction therethrough. In some embodiments of the present invention strap-locating features 16 defined by opposite-side trailing guide-structure 47, opposite-side intermediate guide-structure 48, and/or opposite-side leading guide-structure 49 extend therethrough in directions perpendicular to the direction that adjacent portions of the flexible member 34 extend. Straps 42 that are looped through strap-locating features 16 that are so oriented are prevented from sliding along the flexible member 34. In some embodiments of the present invention an assembly 35 thereof comprises a first flexible-member-routing bracket 10 with leading guide structure 40 that defines one or more strap-locating features 16 and also comprises opposite-side leading guide-structure 49 that defines one or more strap-locating features 16. In some such embodiments of the present invention the leading portion 38 of the transition portion 36 of the flexible member 34 is strapped to the leading guide-structure 40 of the first flexible-member-routing bracket 10 by one or more straps 42 that extend through strap-locating features 16 defined by the leading guide-structure 40. Furthermore, in some such embodiments of the present invention the opposite-side leading portion 55 of the opposite-side transition portion 54 of the flexible member 34 is strapped to the opposite-side leading guide-structure 49 by one or more straps 42 that extend through strap-locating features 16 defined by the opposite-side leading guide-structure 49.

Figure 1:
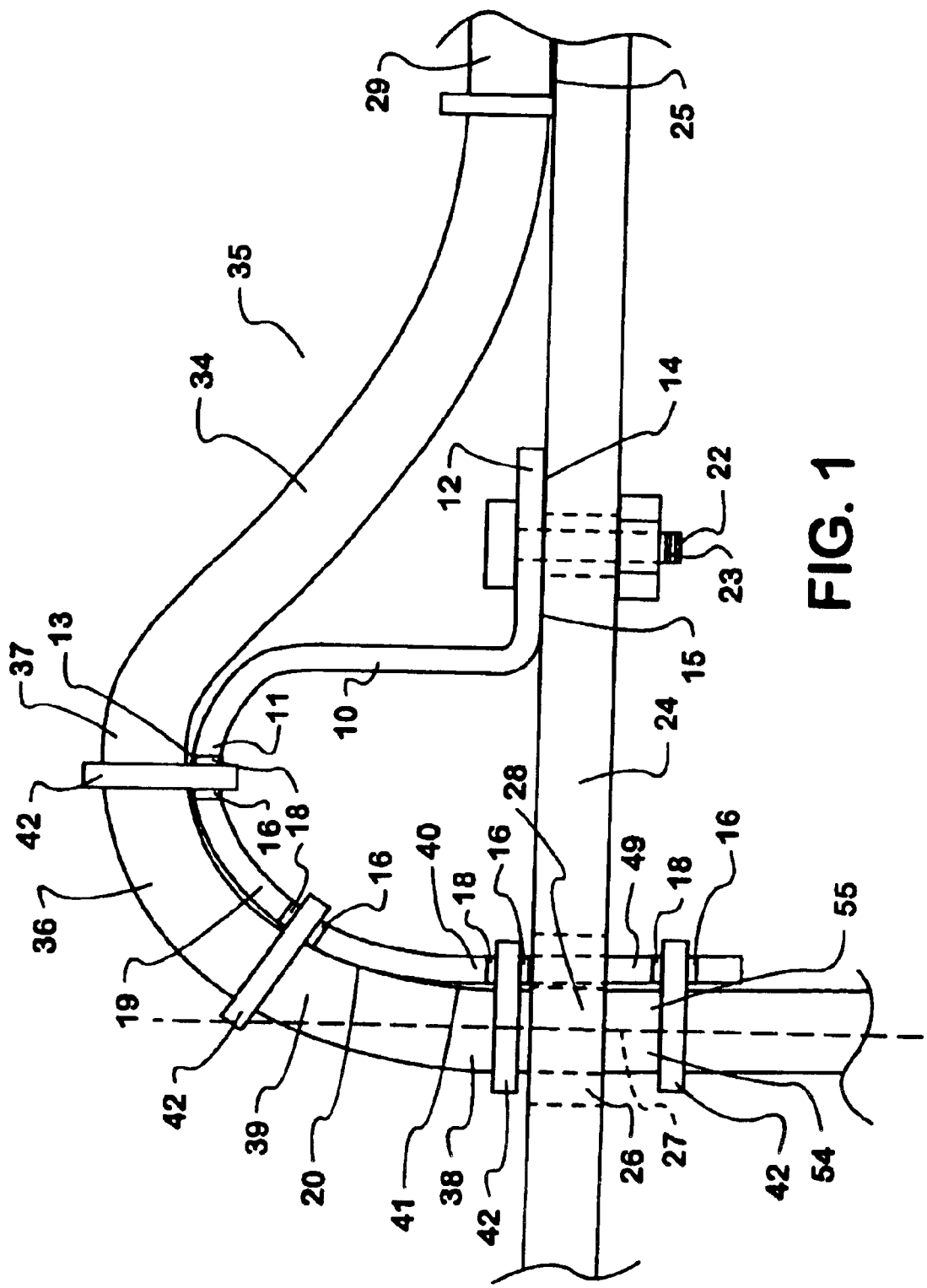
FIG. 1 is a plan view of a first embodiment of an assembly according to the present invention including a first flexible-member-routing bracket that has trailing guide-structure, intermediate guide-structure, and leading guide-structure that extends all the way through the flexible-member-routing aperture.
Figure 2:
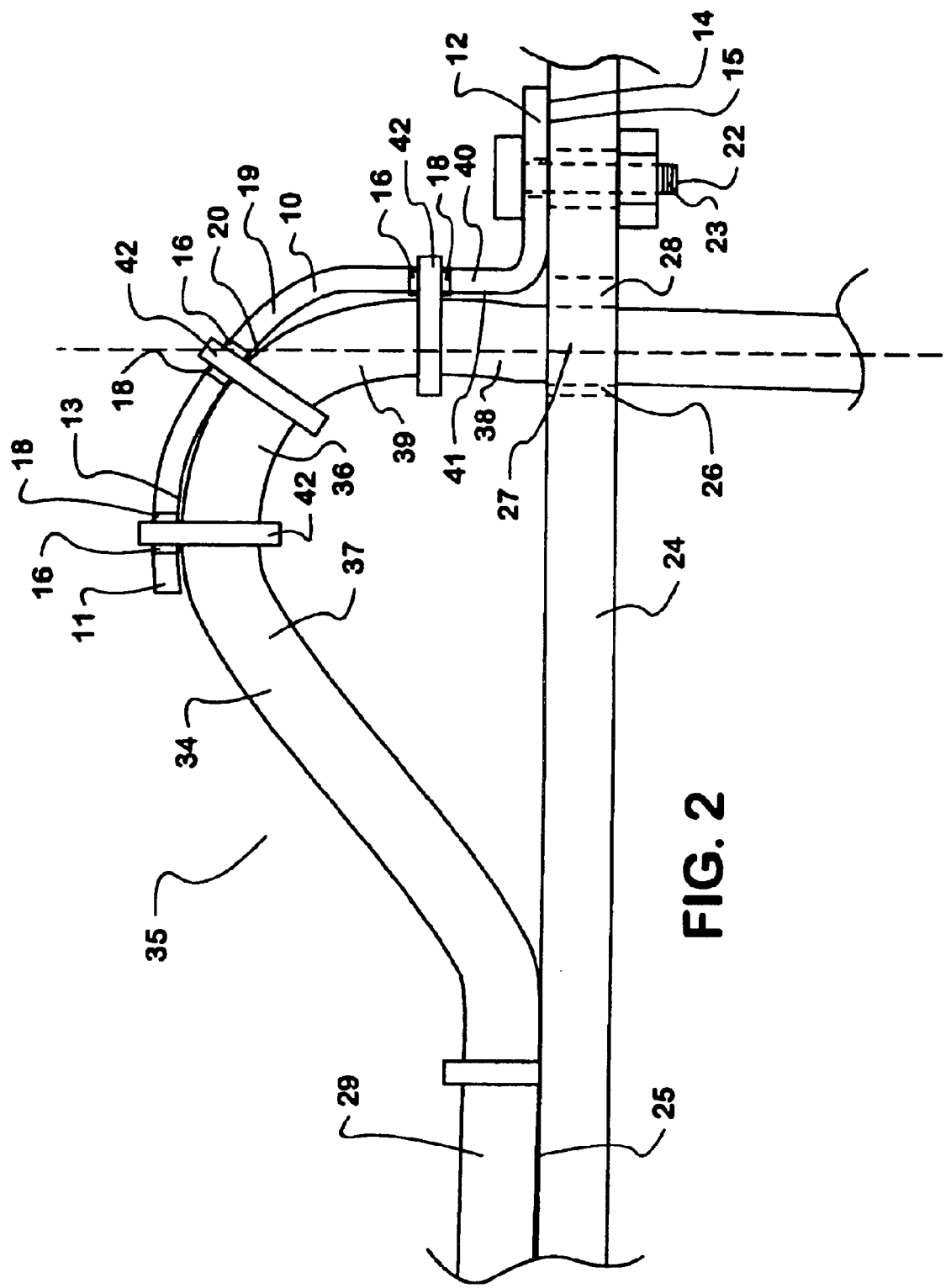
FIG. 2 is a plan view of a second embodiment of an assembly according to the present invention including a first flexible-member-routing bracket with a trailing guide-surface that faces generally toward the flexible-member-routing aperture.
Figure 3:
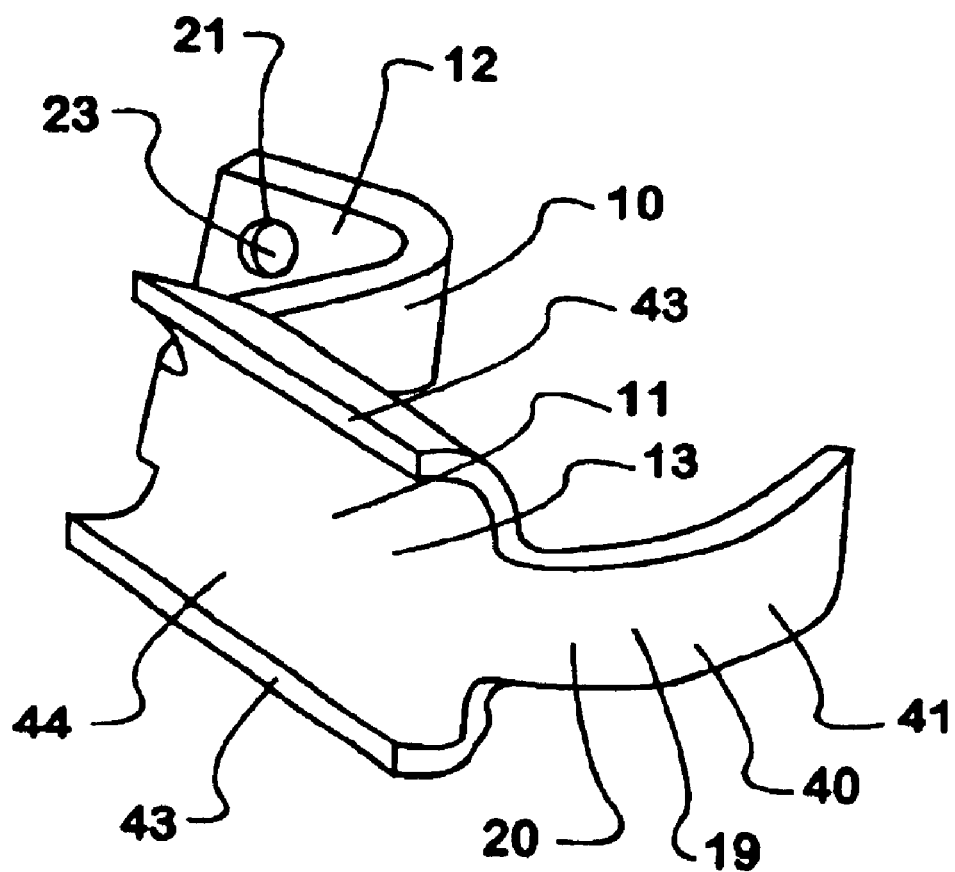
FIG. 3 is a perspective view of an embodiment of a first flexible-member-routing bracket that comprises side guide-structures extending from its trailing guide-structure.

In some embodiments of the present invention, such as that shown in FIG. 3, one or more of the trailing guide-structure 11, leading guide-structure 40, intermediate guide-structure 19, opposite-side trailing guide-structure 47, opposite-side intermediate guide-structure 48, and/or opposite-side leading guide-structure 49 may have side guide-structures 43 engaged to them. In such embodiments of the present invention the side guide-structures 43 define side guide-surfaces 44 adjacent which various portions of the transition portion 36 or the opposite-side transition portion 54 of the flexible member 34 extend in such a manner that the side guide-surfaces 44 further restrict movement of the flexible member 34.

In some embodiments of the present invention, such as those shown in FIGS. 1, 2, 3, 4, 7, 9, 10, 11, 12, 13, 14, 15, 16, and 17, a flexible-member-routing bracket 10, 50 comprises a sheet body that comprises one or more of its mounting structure 12, its trailing guide-structure 11, its leading guide-structure 40, its intermediate structure 19, its opposite-side leading guide-structure 49, its opposite-side trailing guide-structure 47, and its opposite-side intermediate guide-structure 48 and any of its other parts. The term sheet body as it is used within this disclosure is intended to mean a body of matter that has two major surfaces each of which extends approximately parallel to the other along substantially its entire extent and which two major surfaces in aggregate comprise the majority of the surface area of the body of matter. It will be understood that the major surfaces of a sheet body are not necessarily planar in shape. Construction of the multiple portions of a flexible-member-routing bracket 10, 50 from a common sheet body is relatively cost effective because a flat sheet of material may be quickly and easily manipulated in such a manner to form it into a shape that includes those multiple portions of the flexible-member-routing bracket 10, 50.

The flexible member 34 of an assembly according to the present invention may be constructed and engaged to the other components of the assembly in any of a number of manners well-known to and/or easily imaginable by a person of ordinary skill in the art. An assembly 35 according to the present invention may comprise a flexible member 34 that is of any of a number of different types including, but not limited to, tubing, wiring, cable, and optical conductor. A flexible member 34 of an assembly 35 according to the present invention may be engaged to the other components of the assembly in such a manner that it is prevented from translating along its axis relative to the first flexible-member-routing bracket 10 and the flexible-member-routing aperture 26. Alternatively, a flexible member 34 of an assembly 35 according to the present invention may be engaged to the other components of the assembly 35 in such a manner that the flexible member 34 may slide along its axis relative to the first flexible-member-routing bracket 10 and the flexible-member-routing aperture 26. Of course, in such embodiments of the present invention the boundaries of its penetrating portion 28, its distal portion 29, its transition portion 36, its trailing portion 37 of its transition portion 36, its leading portion 38 of its transition portion 36, its intermediate portion 39 of its transition portion 36, its opposite-side distal portion 58, and, where applicable, the boundaries of its opposite-side transition portion 54, its opposite-side leading portion 55 of its opposite-side transition portion 54, its opposite-side trailing portion 56 of its opposite-side transition portion 54, and its opposite-side intermediate portion 57 of its opposite-side transition portion 54 are dynamic and dependent upon the flexible member's 34 axial position relative to the first flexible-member-routing bracket 10 and the flexible-member-routing aperture 26. Of course it will also be understood that there may be more than one flexible member 34 that extends adjacent the first flexible-member-routing bracket 10 and through the flexible-member-routing aperture 26.

Within the guidelines set forth in this disclosure, the form of flexible-member-routing brackets 10, 50 may vary in a number of different ways to accommodate variable aspects of the construction of assemblies 35 according to the present invention. One such variable aspect of the construction of assemblies 35 according to the present invention that affects the form of flexible-member-routing brackets 10, 50 for use therein is the shape of the structure to which the first flexible-member-routing bracket 10 is to be mounted to and the orientation of that structure relative to the flexible-member-routing aperture 26. In some embodiments of the present invention a flexible-member-routing bracket 10, 50 is particularly well-adapted for use in assemblies, such as those shown in FIGS. 1, 2, 5, 6, 7, 8, 9, 10, 11, 16, and 17, in which the structure to which the flexible-member-routing bracket 10, 50 is to be mounted is flat and disposed at an angle of 30 degrees or more to the aperture axis 27 of the flexible-member-routing aperture 26. In some embodiments of the present invention the mounting structure 12 of a flexible-member-routing bracket 10, 50 defines a planar mounting surface 14 that is disposed in a mounting plane 15 of the flexible-member-routing bracket 10, 50. In some such embodiments of the present invention a flexible-member-routing bracket 10, 50 further has a leading guide-surface 41 that is disposed at an angle of at least 30 degrees relative to the mounting plane 15 and a trailing guide-surface 13 that is disposed at an angle of less than 60 degrees relative to the mounting plane 15 and an angle of at least 30 degrees relative to the leading guide-surface 41. In some such embodiments of the present invention the trailing guide-surface 13 is approximately parallel to the mounting plane 15 of the flexible-member-routing bracket 10, 50 and the trailing guide-surface 13 is approximately perpendicular to the leading guide-surface 41 of the flexible-member-routing bracket 10, 50. In some embodiments of the present invention, such as those shown in FIGS. 1, 7, 11, 12, 13, 14, 15, 16, and 17, the leading guide-structure 40 extends up to the mounting plane 15 where it meets and is engaged to opposite-side leading guide-structure 49 which defines an opposite-side leading guide-surface 51 that is disposed at an angle of at least 30 degrees relative to the mounting plane 15. In some such embodiments of the present invention the first flexible-member-routing bracket 10 further comprises opposite-side trailing guide-structure 47 that defines an opposite-side trailing guide-surface 52 that is disposed at an angle of less than 60 degrees relative to the mounting plane 15 and an angle of at least 30 degrees relative to the opposite-side leading guide-surface 51. In some-such embodiments of the present invention the first flexible-member-routing bracket 10 further comprises opposite-side intermediate guide-structure 48 that extends between the opposite-side leading guide-structure 49 and the opposite-side trailing guide-structure 47. In some such embodiments of the present invention the opposite-side intermediate guide-structure 48 defines an opposite-side intermediate guide-surface 53 that extends in a sweeping manner between the opposite-side leading guide-surface 51 and the opposite-side trailing guide-surface 52.

Figure 4:
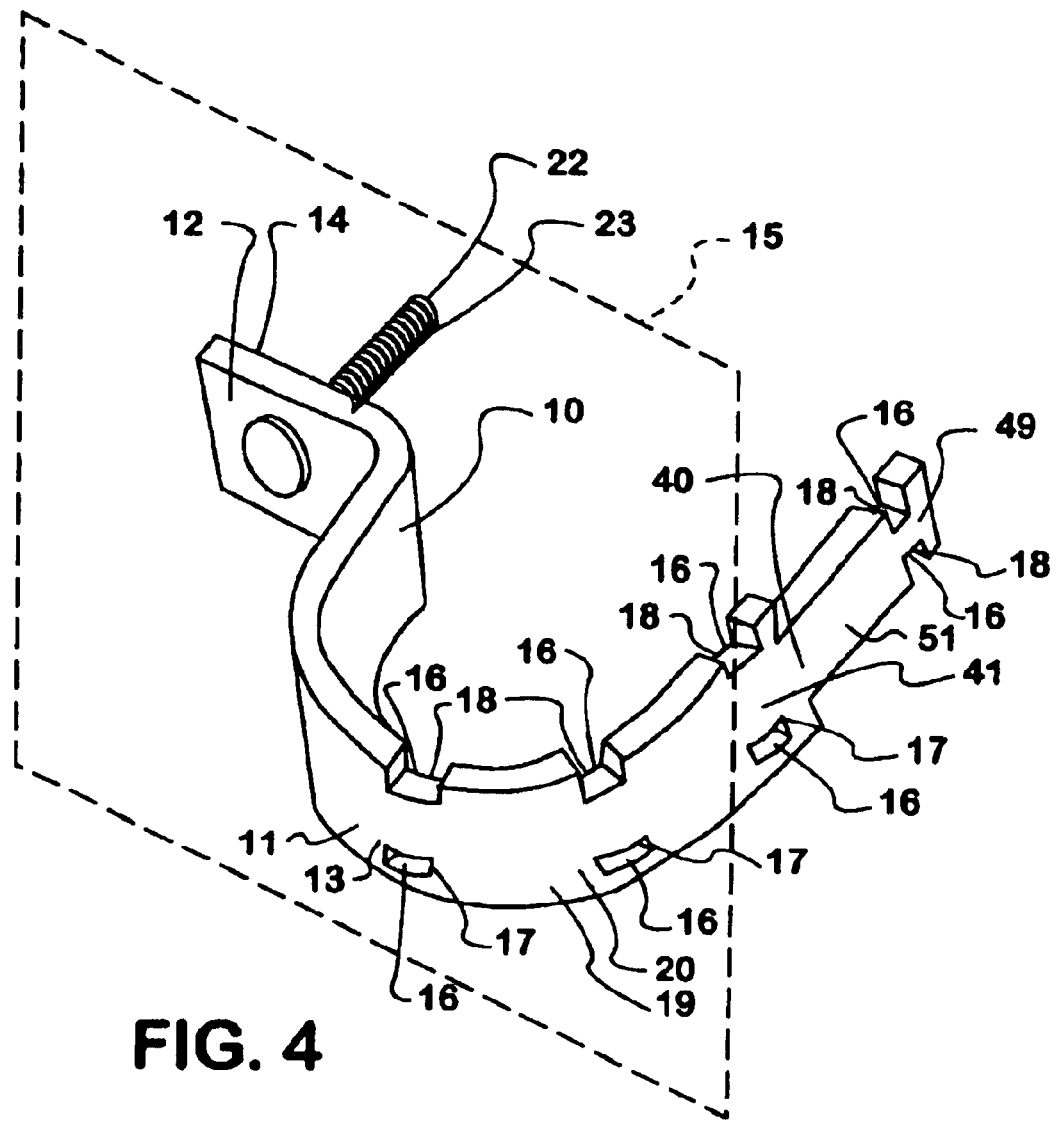
FIG. 4 is a perspective view of the first flexible-member-routing bracket shown in FIG. 1.
Figure 5:
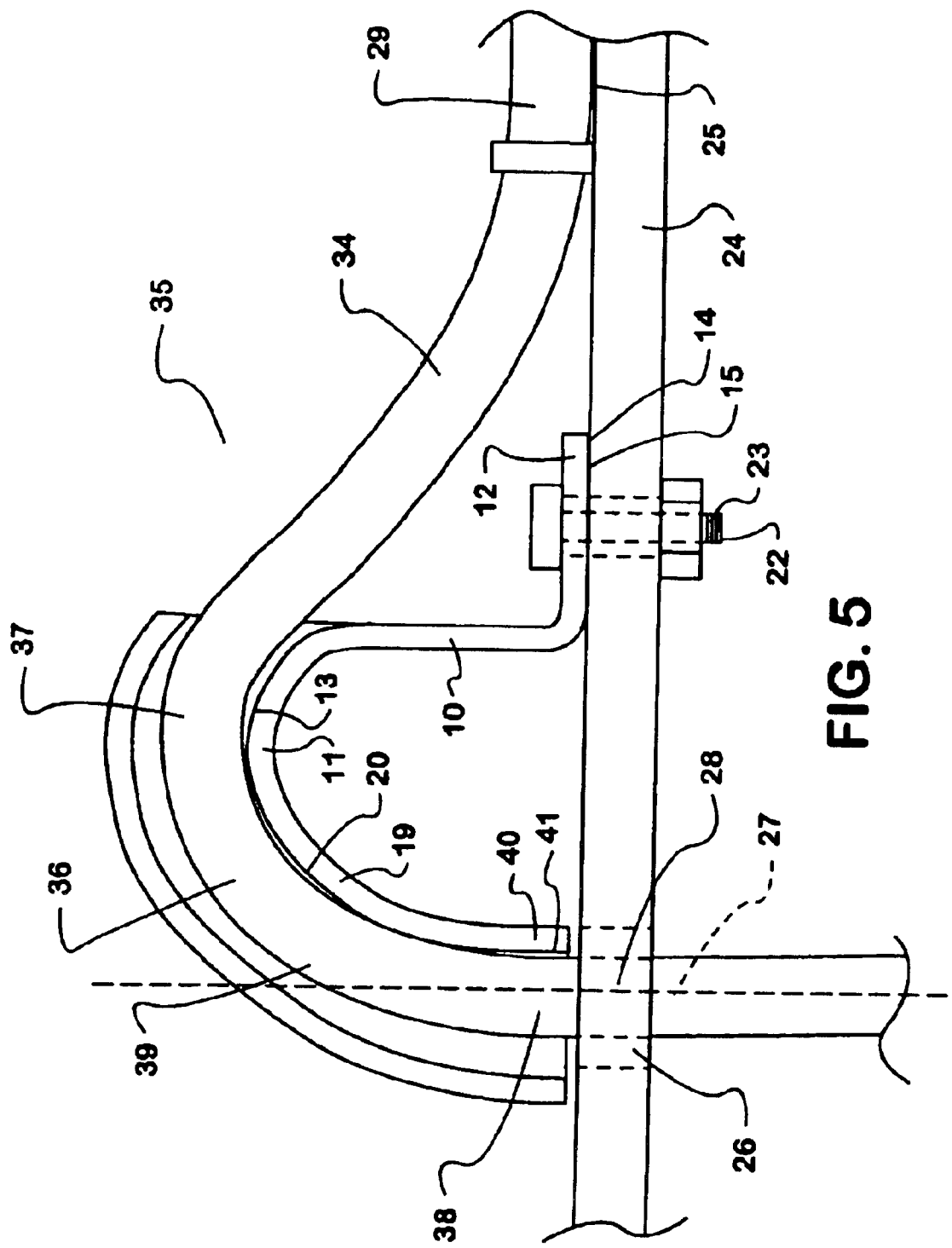
FIG. 5 is a plan view of a third embodiment of an assembly according to the present invention including a first flexible-member-routing bracket with a guide surface that is parallel to and faces its trailing guide-surface, which faces away from the flexible-member-routing aperture.
Figure 6:
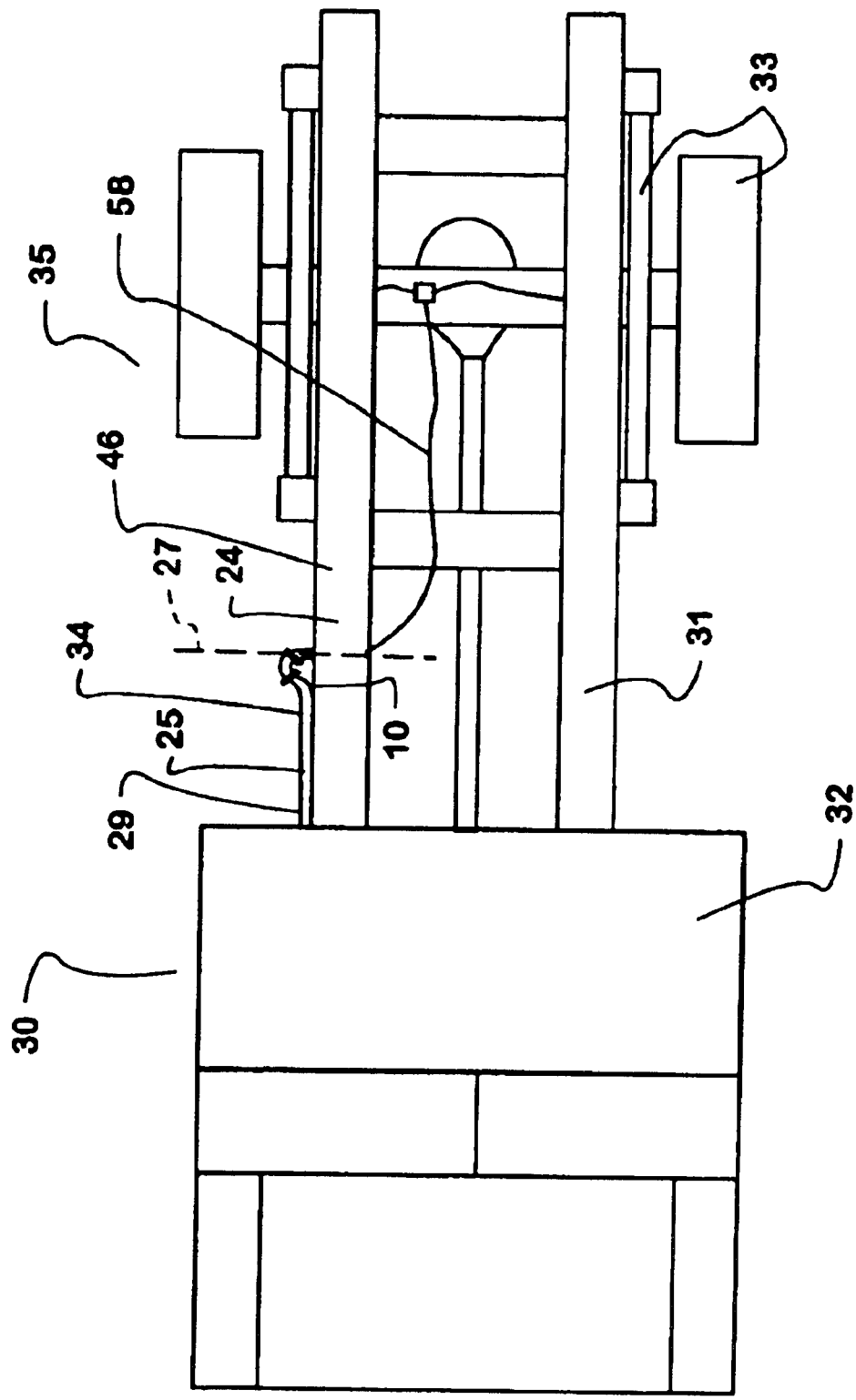
FIG. 6 is a plan view of a fourth embodiment of an assembly according to the present invention, which assembly is a vehicle.
Figure 7:
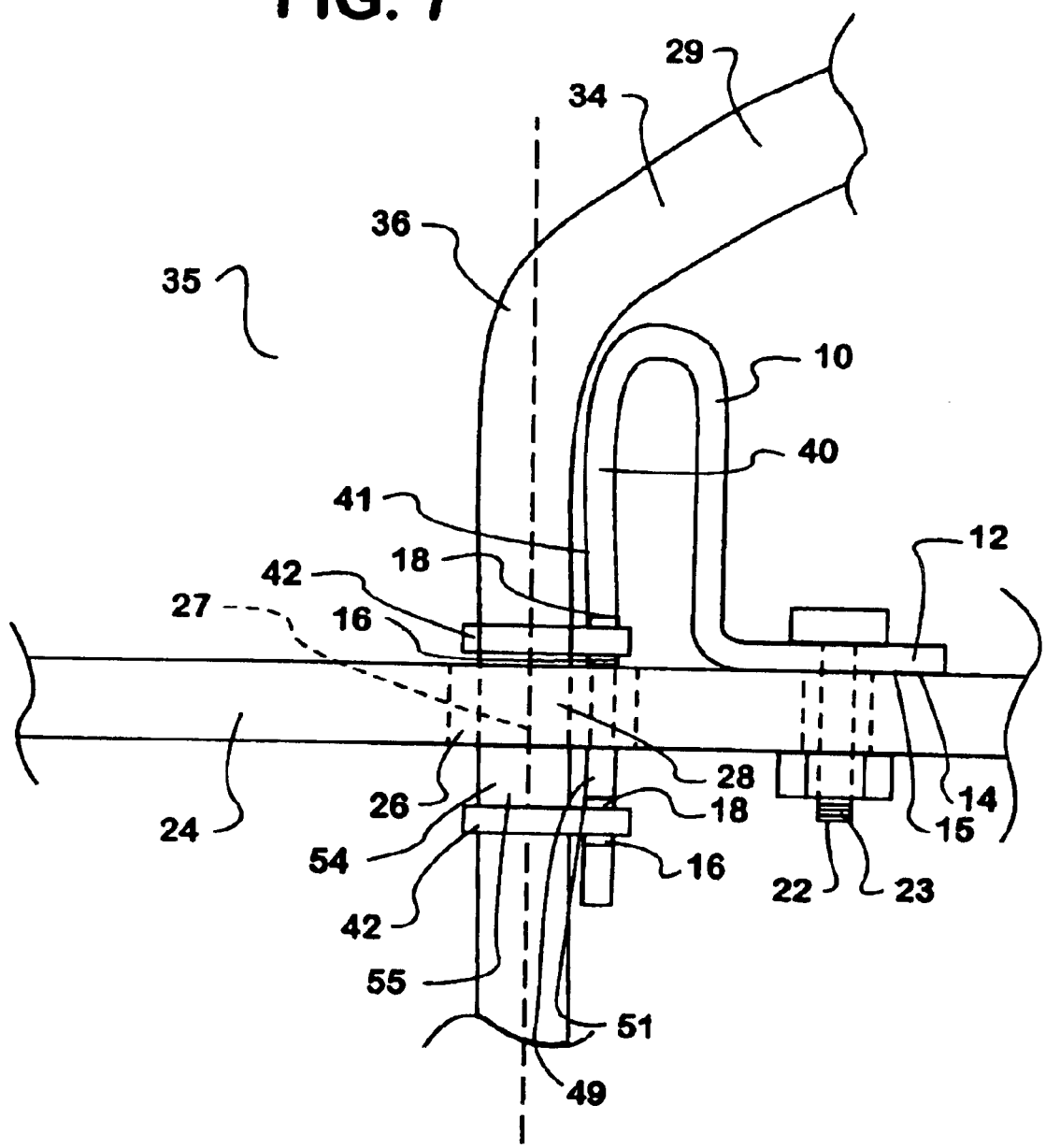
FIG. 7 is a plan view of a fifth embodiment of an assembly according to the present invention including a first flexible-member-routing bracket that does not comprise trailing guide-structure, but does comprises leading guide-structure that extends all the way through the flexible-member-routing aperture.
Figure 8:
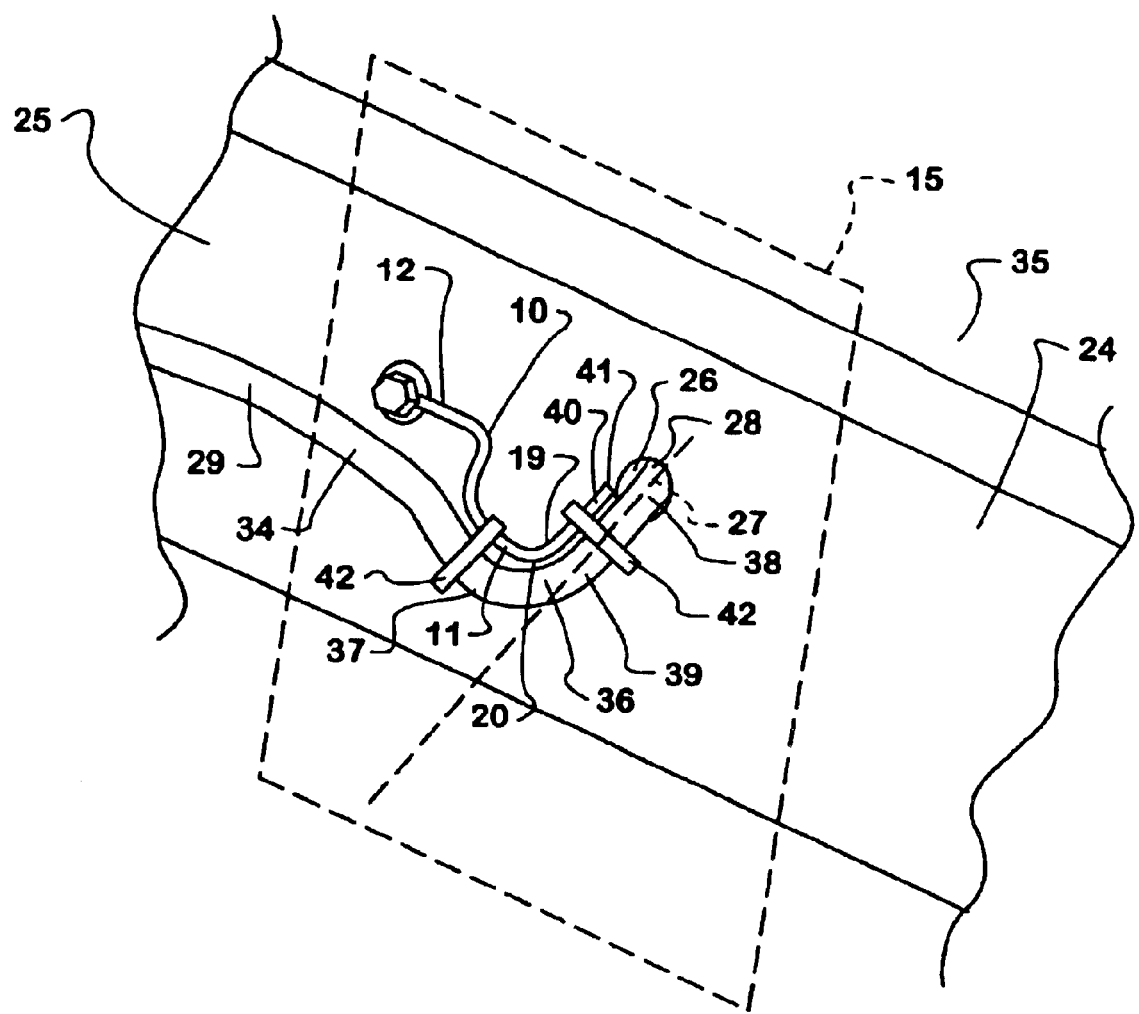
FIG. 8 is a perspective view of a sixth embodiment an assembly according to the present invention including a first flexible-member-routing bracket that comprises no sheet body portions.
Figure 9:
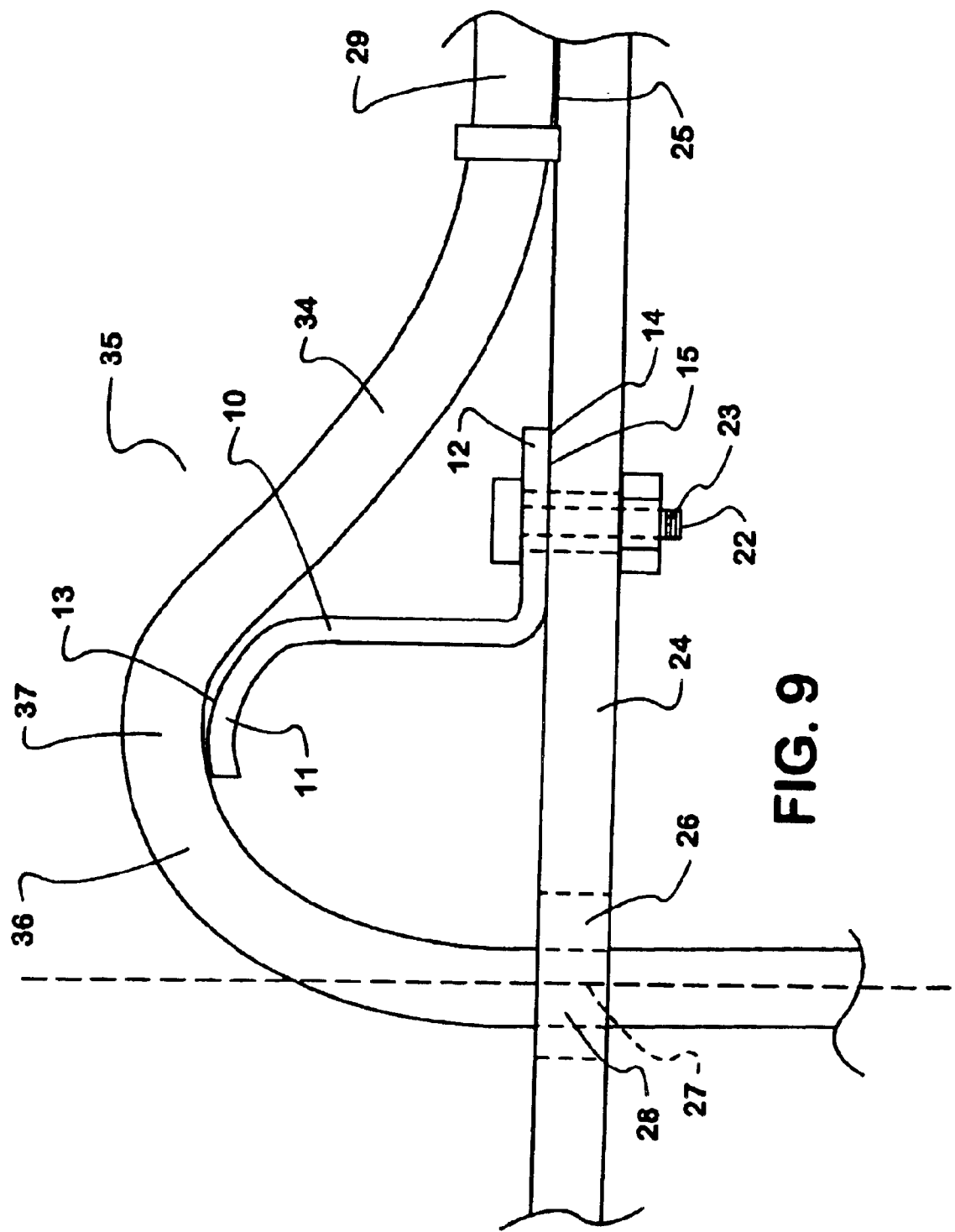
FIG. 9 is a plan view of a seventh embodiment of an assembly according to the present invention including a first flexible-member-routing bracket that comprises trailing guide-structure, but no leading guide-structure or intermediate guide-structure.

In some embodiments of the present invention, such as the one shown in FIG. 4, a flexible-member-routing bracket 10, 50 comprises a mounting feature 23 to facilitate easier assembly of first flexible-member-routing bracket 10, 50 to a divider component 24. Such a mounting feature 23 would be a mounting aperture 21 or a fastener 22 fixedly engaged to the mounting structure 12 of the flexible-member-routing bracket 10, 50. A fastener 22 that is fixedly engaged to the mounting structure 12 of a flexible-member-routing bracket 10, 50 and that, thereby, functions as a mounting feature 23 may be any of a number of different types of fasteners including, but not limited to, threaded fasteners, rivets, and clips.

The components and teachings of the present invention can be applied to virtually any type of assembly 35 that includes a flexible member 34 with a penetrating portion 28 that extends through a flexible-member-routing aperture 26 and a distal portion 29 that extends at an angle relative to the aperture axis 27 of the flexible-member-routing aperture 26. One type of assembly 35 that may be constructed with the components and according to the teachings of the present invention is a vehicle 30. A vehicle 30 according to the present invention comprises one or more frame structures 31 that have a rigid and strong construction, to which a majority of other components of the vehicle 10 are directly or indirectly engaged and from which those components directly or indirectly derive support. A vehicle 30 according to the present invention also includes a suspension system 33 that is engaged to the one or more frame structures 31 of the vehicle 30 and that provides the vehicle 30 with a relatively low resistance to movement along the ground. A vehicle 30 according to the present invention further comprises one or more body structures 32 that are mounted to the one or more frame structures 31 of the vehicle 30 and upon or within which cargo and/or occupants of the vehicle 30 may reside. In embodiments of the present invention in which the assembly 35 is a vehicle 30, the divider component 24 may be any one of innumerable different components of the vehicle 30. In some embodiments of the present invention the divider component 24 is a frame rail 46 of one of the one or more frame structures 31 of the vehicle 30.

It will, of course, be understood that an assembly 35 according to the present invention could be of any of a number of different constructions within the guidelines set forth above and that some features of the invention could be employed without a corresponding use of other features.

I claim:

1. An assembly, comprising:
   (a) a first flexible-member-routing bracket that is serviceably fixedly mounted to a divider component of said assembly adjacent a flexible-member-routing aperture defined by said divider component;
   (b) a flexible member that comprises a penetrating portion that extends through said flexible-member-routing aperture:
   (c) wherein said flexible member further comprises a distal portion that extends away from said flexible-member-routing aperture at an angle of at least 30 degrees relative to an aperture axis of said flexible-member-routing aperture;
   (d) wherein said flexible member further comprises a transition portion that extends between said penetrating portion and said distal portion thereof;
   (e) wherein said first flexible-member-routing bracket comprises leading guide-structure that defines a leading guide-surface that is disposed adjacent said flexible-member-routing aperture and that is disposed at an angle of less than 60 degrees relative to said aperture axis;
   (f) wherein a leading portion of said transition portion of said flexible member extends adjacent said leading guide-surface and is strapped to said leading guide-structure;
   (a) wherein said leading guide-structure extends through said flexible-member-routing aperture where it meets and is engaged to opposite-side leading guide-structure that is disposed upon a side of said divider component opposite said trailing guide-structure;
   (g) wherein said opposite-side leading guide-structure defines an opposite-side leading guide-surface that is disposed adjacent said flexible-member-routing aperture and that extends at an angle of less than 60 degrees relative to said aperture axis;
   (h) wherein said flexible member further comprises an opposite-side distal portion that is disposed upon a side of said penetrating portion opposite said distal portion of said flexible member;
   (i) wherein said opposite-side distal portion of said flexible member extends away from said flexible-member-routing aperture at an angle of at least 30 degrees;
   (j) wherein said flexible member comprises an opposite-side transition portion that extends between said penetrating portion and said opposite-side distal portion; and
   (k) wherein an opposite-side leading portion of said apposite-side transition portion of said flexible member extends adjacent said opposite-side leading guide-surface and is strapped to said opposite-side leading guide-structure.

2. The assembly of claim 1, wherein:
   (a) said leading guide-structure defines one or more strap-locating features through which extend one or more straps that strap said leading portion of said transition of said flexible member to said leading guide-structure; and
   (b) said opposite-side leading guide-structure defines one or more strap-locating features through which extend one or more straps that strap said opposite-side leading portion of said opposite-side transition portion of said flexible member.

3. The assembly of claim 2, wherein:
   (a) said assembly is a vehicle;
   (b) said vehicle comprises one or more frame structures to which a majority of other components of said vehicle are directly or indirectly engaged and which derive support directly or indirectly from said one or more frame structures;
   (c) said vehicle comprises a suspension system that is engaged to said one or more frame structures above the ground and provides said vehicle with a relatively low resistance to movement along the ground; and
   (d) said vehicle comprises one or more body structures that are mounted to said one or more frame structures and upon or within which cargo and/or occupants may reside.

4. The assembly of claim 3, wherein:
   (a) said first flexible-member-routing bracket comprises trailing guide-structure that defines a trailing guide-surface that is disposed at an angle of at least 30 degrees relative to said aperture axis and that is disposed at a distance from said flexible-member-routing aperture in directions parallel to said aperture axis and directions perpendicular to said aperture axis;
   (b) said trailing guide-surface is disposed at an angle of at least 30 degrees relative to said leading guide-surface; and
   (c) wherein a trailing portion of said transition portion of said flexible member extends adjacent to said trailing guide-surface.

* * * * *